US012732424B2

(12) United States Patent
Sun

(10) Patent No.: US 12,732,424 B2
(45) Date of Patent: Sep. 8, 2026

(54) ENERGY SAVING THROUGH FLEXIBLE KUBERNETES POD CAPACITY SELECTION DURING HORIZONTAL POD AUTOSCALING (HPA)

(71) Applicant: Rakuten Symphony, Inc., Tokyo (JP)

(72) Inventor: Kexuan Sun, Surrey (GB)

(73) Assignee: RAKUTEN SYMPHONY, INC., Tokyo (JP)

( * ) Notice: Subject to any disclaimer, the term of this patent is extended or adjusted under 35 U.S.C. 154(b) by 67 days.

(21) Appl. No.: 18/292,926

(22) PCT Filed: Oct. 30, 2023

(86) PCT No.: PCT/US2023/036255
§ 371 (c)(1),
(2) Date: Jan. 29, 2024

(87) PCT Pub. No.: WO2025/042407
PCT Pub. Date: Feb. 27, 2025

(65) Prior Publication Data

US 2025/0088416 A1 Mar. 13, 2025

Related U.S. Application Data

(60) Provisional application No. 63/578,368, filed on Aug. 24, 2023.

(51) Int. Cl.
*H04L 41/0816* (2022.01)
*G06N 3/08* (2023.01)
(Continued)

(52) U.S. Cl.
CPC ........... *H04L 41/0816* (2013.01); *G06N 3/08* (2013.01); *H04L 41/0833* (2013.01); *H04L 41/0895* (2022.05)

(58) Field of Classification Search
None
See application file for complete search history.

(56) References Cited

U.S. PATENT DOCUMENTS 8,949,394 B1 * 2/2015 Papagiannaki ....... H04L 41/147 709/223
10,503,553 B1 * 12/2019 Ashok ................ G06F 11/3024
(Continued)

FOREIGN PATENT DOCUMENTS

EP 4530847 A1 * 4/2025 ......... H04L 41/5051
WO WO-2018045642 A1 * 3/2018 ....... G06F 18/23213
(Continued)

OTHER PUBLICATIONS

Klinaku et al.; "Hitchhiker's Guide for Explainability in Autoscaling"; 2023 ACM/SPEC International Conference on Performance Engineering (ICPE '23 Companion), Apr. 15-19, 2023; 6 pages; https://doi.org/10.1145/3578245.3584728 (Year: 2023).*

*Primary Examiner* — Sandarva Khanal
(74) *Attorney, Agent, or Firm* — HAUPTMAN HAM, LLP

(57) ABSTRACT

An Artificial Intelligent/Machine Learning (AI/ML)-based horizontal pod autoscaler (HPA) receives performance metrics regarding resource allocation and capacity of pods. The current traffic demand is measured and future traffic demand is predicted versus current system capacity. Pod capacity and scaling is selected based on the measured current and predicted future traffic demand verses current system capacity. Scaling commands are generated for the selected pod capacity and the selected scaling. The scaling commands are sent to a Kubernetes API to scale pods.

17 Claims, 14 Drawing Sheets

(51) Int. Cl.
*H04L 41/0833* (2022.01)
*H04L 41/0895* (2022.01)

(56) References Cited

U.S. PATENT DOCUMENTS

| | | | | |
|---|---|---|---|---|
| 10,944,691 | B1 * | 3/2021 | Raut | H04L 45/64 |
| 11,411,886 | B1 * | 8/2022 | Bhandari | H04L 47/803 |
| 11,843,545 | B1 * | 12/2023 | Vasamsetti | H04L 47/765 |
| 11,882,006 | B1 * | 1/2024 | Nesteroff | H04L 41/12 |
| 2016/0323377 | A1 * | 11/2016 | Einkauf | H04L 67/1031 |
| 2019/0173765 | A1 * | 6/2019 | Bertran | H04L 41/5032 |
| 2022/0107842 | A1 * | 4/2022 | Jiang | G06F 9/5061 |
| 2022/0385542 | A1 * | 12/2022 | Gokan Khan | H04L 41/0895 |
| 2023/0028922 | A1 * | 1/2023 | Wang | H04L 45/58 |
| 2023/0072358 | A1 * | 3/2023 | Baillargeon | G06F 9/5088 |
| 2023/0114504 | A1 * | 4/2023 | He | G06F 9/5083 718/105 |
| 2023/0292291 | A1 * | 9/2023 | Huang | H04W 24/02 |
| 2023/0300676 | A1 * | 9/2023 | Tomic | H04W 28/0942 370/232 |
| 2024/0086297 | A1 * | 3/2024 | Vasamsetti | G06F 11/2038 |
| 2024/0397347 | A1 * | 11/2024 | Rank | H04W 24/04 |
| 2024/0419457 | A1 * | 12/2024 | Wang | G06F 9/5027 |
| 2025/0007784 | A1 * | 1/2025 | Hursey | H04L 41/122 |

FOREIGN PATENT DOCUMENTS

| | | | | |
|---|---|---|---|---|
| WO | WO-2021205204 | A1 * | 10/2021 | G06F 9/505 |
| WO | WO-2023106980 | A1 * | 6/2023 | G06F 9/5072 |
| WO | WO-2023144831 | A1 * | 8/2023 | H04W 24/02 |
| WO | WO-2023191831 | A1 * | 10/2023 | G06F 9/5011 |
| WO | WO-2024225749 | A1 * | 10/2024 | G06F 9/50 |

* cited by examiner

ENERGY SAVING THROUGH FLEXIBLE KUBERNETES POD CAPACITY SELECTION DURING HORIZONTAL POD AUTOSCALING (HPA)

PRIORITY CLAIM AND CROSS-REFERENCE

The present application is a National Phase of International Application No. PCT/US2023/036255, filed Oct. 30, 2023 which claims priority to U.S. Provisional Application No. 63/578,368 filed Aug. 24, 2023.

TECHNICAL FIELD

This description relates to energy saving through flexible Kubernetes pod capacity selection during Horizontal Pod Autoscaling (HPA), and method of using the same.

BACKGROUND

An Open-Radio Access Network (O-RAN) promotes virtualized RANs where disaggregated components are connected via open interfaces and optimized by intelligent controllers. O-RAN networks are able to be built with multi-vendor, interoperable components, and are able to be programmatically optimized through a centralized abstraction layer and data-driven closed-loop control. An O-RAN architecture includes a Service Management and Orchestration (SMO) that addresses the orchestration, management, and automation aspects of O-RAN. The SMO is supports and manages the multi-vendor RAN environment.

The elements of O-RAN architecture, such as the O-Radio Unit (O-RU), O-Distributed Unit (O-DU), O-Centralized Unit (O-CU), Near-Real-Time RAN Intelligent Controller (Near-RT RIC), are able to be deployed within cloud and physical locations. The components of the O-RAN architecture is able to be deployed onto Kubernetes clusters. In cloud-based applications based on Kubernetes, autoscaling allows optimal allocation of resources to an application based its current resource consumption. Vertical scaling (VS) and horizontal scaling (HS) of virtual radio access networks (RAN slices), including dynamic instantiation and termination of on-demand RAN slices, enables resource allocation to be adapted based on demand variations. In Kubernetes, a workload resource, such as a Deployment or StatefulSet, is able to be updated to scale the workload to match demand. Horizontal scaling refers to deploying more Pods. Vertical scaling, for Kubernetes, means assigning more resources (for example: memory or CPU) to the Pods that are already running for the workload. In response to the load decreasing where the number of Pods is above the configured minimum, the workload resource is able to scale back down. Horizontal pod autoscaling does not apply to objects that can't be scaled, e.g., a DaemonSet.

However, the system capacity is able to be more than actual traffic load because of fixed pod capacity. This leads to a waste of energy.

SUMMARY

In at least embodiment, a method for saving energy through flexible Kubernetes pod capacity selection during horizontal pod autoscaling (HPA) includes implementing an Artificial Intelligent/Machine Learning (AI/ML)-based horizontal pod autoscaler (HPA). At the HPA, performance metrics are received regarding resource allocation and capacity of pods. A current traffic demand is measured and predicting a future traffic demand versus a current system capacity is predicted. A selection is made of a pod capacity and scaling in terms of a number of pods and a pod capacity version based on the measured current traffic demand and the predicted future traffic demand verses the current system capacity to provide optimal performance for the current traffic demand and the future traffic demand according to pod capacity categories. Scaling commands for the selected pod capacity and the selected scaling are generated to provide fine grained scaling for optimizing energy consumption according to pod capacity categories. Based on the scaling commands, pods are scaled to fulfill the current traffic demand and the future traffic demand according to pod capacity categories.

In at least one embodiment, a device includes a KPI predictor configured to receive performance metrics regarding resource allocation and capacity of pods, measure a current traffic demand, and predict a future traffic demand versus a current system capacity. A scaling decision is configured to select a pod capacity and scaling in terms of a number of pods and a pod capacity version based on the measured current traffic demand and the predicted future traffic demand verses the current system capacity to provide optimal performance for the current traffic demand and the future traffic demand according to pod capacity categories. The scaling decision generates scaling commands for the selected pod capacity and the selected scaling to provide fine grained scaling for optimizing energy consumption according to the pod capacity categories. A container manager is configured to receiving the scaling commands to scale pods to fulfill the current traffic demand and the future traffic demand according to pod capacity categories.

In at least one embodiment, a non-transitory computer-readable media having computer-readable instructions stored thereon for performing operations including implementing an Artificial Intelligent/Machine Learning (AI/ML)-based horizontal pod autoscaler (HPA). At the HPA, performance metrics are received regarding resource allocation and capacity of pods. A current traffic demand is measured and predicting a future traffic demand versus a current system capacity is predicted. A selection is made of a pod capacity and scaling in terms of a number of pods and a pod capacity version based on the measured current traffic demand and the predicted future traffic demand verses the current system capacity to provide optimal performance for the current traffic demand and the future traffic demand according to pod capacity categories. Scaling commands for the selected pod capacity and the selected scaling are generated to provide fine grained scaling for optimizing energy consumption according to pod capacity categories. Based on the scaling commands, pods are scaled to fulfill the current traffic demand and the future traffic demand according to pod capacity categories.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
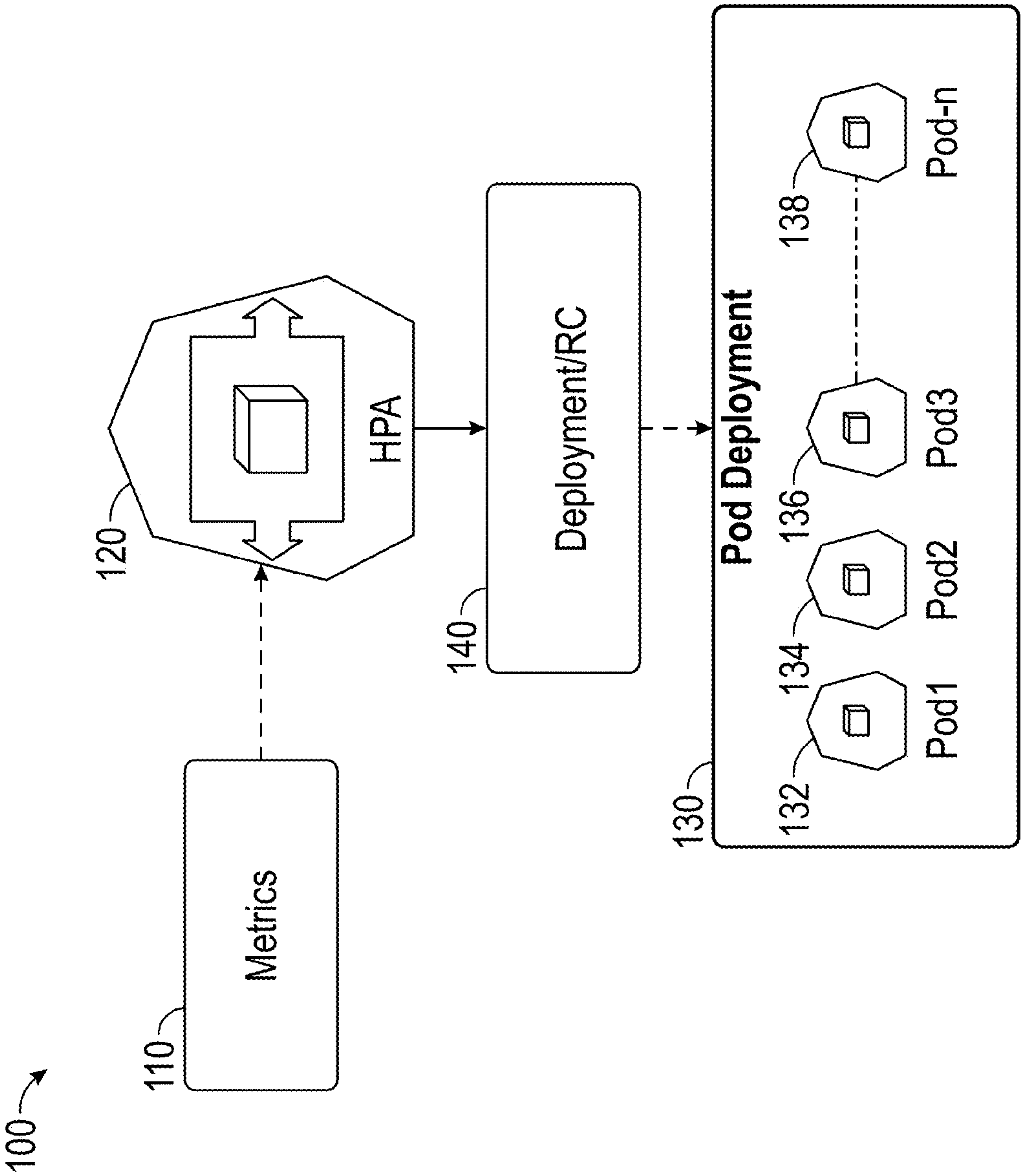
FIG. 1 shows Horizontal Pod Autoscaling (HPA) in Kubernetes according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for saving energy through flexible Kubernetes pod capacity selection during horizontal pod autoscaling (HPA) includes implementing an Artificial Intelligent/Machine Learning (AI/ML)-based horizontal pod autoscaler (HPA), receiving, at the HPA, performance metrics regarding resource allocation and capacity of pods, measuring a current traffic demand and predicting a future traffic demand versus a current system capacity, selecting a pod capacity and selecting scaling in terms of a number of pods and a pod capacity version based on the measured current traffic demand and the predicted future traffic demand verses the current system capacity to provide optimal performance for the current traffic demand and the future traffic demand according to pod capacity categories, generating scaling commands for the selected pod capacity and the selected scaling to provide fine grained scaling for optimizing energy consumption according to pod capacity categories, and based on the scaling commands, scaling pods to fulfill the current traffic demand and the future traffic demand according to pod capacity categories.

Embodiments described herein provide method that provides one or more advantages. For example, energy is saved in the cloud data center for significant Operating Expense (OPEX) saving and CO2 emission reduction. In 5G cellular network, 20-40% percent of OPEX is from the energy bills, and 20-30% of the energy consumption occurs in the cloud data center deploying O-DUs, O-CUs, core networks, applications, and management services. Furthermore, according to the statistics, 2% of the CO2 emissions come from the mobile network in the world, which is a significant number. Thus, an important objective is to reduce CO2 emissions.

FIG. 1 shows Horizontal Pod Autoscaling (HPA) in Kubernetes 100 according to at least one embodiment.

In FIG. 1, Metrics 110 are provided to a Horizontal Pod Autoscaler (HPA) 120. The Metrics 110 indicate how busy the system is, e.g., an indication of the traffic. For example, the Metrics 110 are able to indicate a Number of RRC connections, a Number of active/inactive UEs, a Number of DRBs, an average throughput, and the like. Horizontal Pod Autoscaling (HPA) 120 determines scaling for a number of pods in a Pod Deployment 130 bound to Deployment/Replication Controller (RC) 140 based on the Metrics 110. HPA 120 checks Metrics 110 collected from the system against threshold values pre-configured. In response to the current value being higher than the specified threshold, the HPA 120 attempts to increase the number of pods. HPA 120 is also able to scale down the number of pods in Pod Deployment 130. HPA 120 communicates with the Deployment/RC 140 to auto scale in and out the Kubernetes to meet the system demand, e.g., the configuration and the number of pods in the Pod Deployment 130 are scaled in and out.

By default, Kubernetes supports CPU-based and memory-based pod auto-scaling.

However, a user is able to configure the HPA 120 to scale based on Metrics, e.g., a custom metric or external metrics. During the horizontal autoscaling, the CPU and memory allocated to the pods in the Pod Deployment 130 is fixed (e.g., the same applications and the same capacity such as 6 gigabits/second (GB/s)), therefore, the capacity of the system is scaled up and down at a fixed step following the actual traffic demand trend. However, according to at least one embodiment, pods with different configurations are pre-generated and pre-compiled for Pod Deployment 130. For example, there are pod configuration 1, pod configuration 2, pod configuration 3, etc., wherein pod 1 132 is 2 GB/s, pod 2 134 is 4 GB/s, pod 3 136 is 6 GB/s, and the like including Pod n 138.

Figure 2:
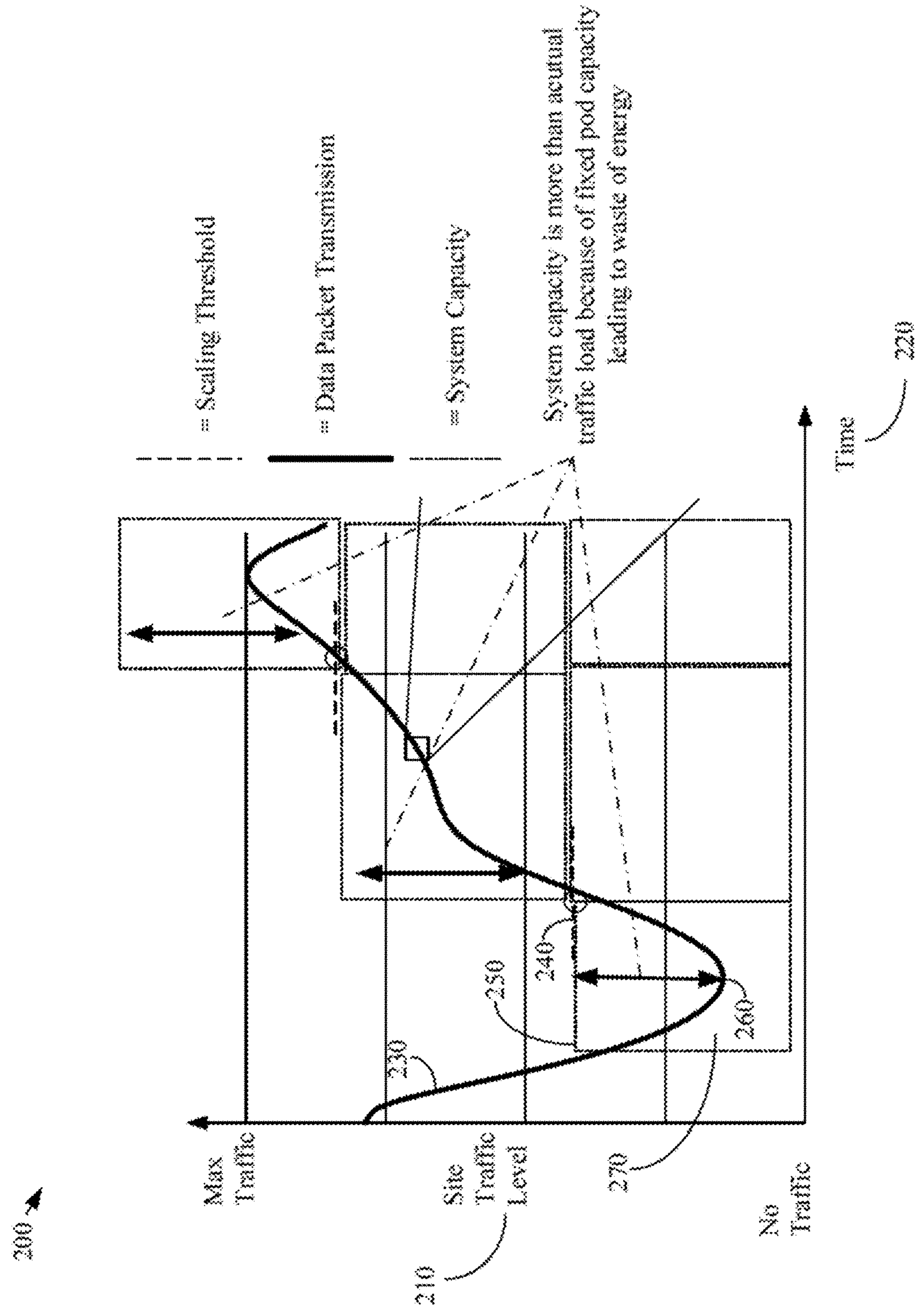
FIG. 2 illustrates a traffic curve demonstrating energy wasting with a current HPA.

FIG. 2 illustrates a traffic curve 200 demonstrating energy wasting with a current HPA.

In FIG. 2, a change in Site Traffic Level 210 from "No Traffic" to "Max Traffic" is plotted verses Time 220. The curve 230 indicates the real-time traffic verses time. A scaling threshold 240 is shown at a point in a plot of data packet transmission. Due to the fixed step, most of the time, the actual capacity 250 provided by the system is higher than the actual traffic demand 260, i.e., the CPU and memory resource allocated is more than what is specified for use, leading to energy waste in the cloud data center.

System capacity 250 is shown at different levels for the data packet transmission. Thus, system capacity 250 is increased to more than the actual traffic load 260 because of fixed pod capacity. This leads to a waste of energy. In response to the capacity increasing, the HPA keeps increasing the number of pods to scale out the capacity 250 to catch up the demand from the traffic. The curve 230 indicates the real-time traffic verses time. For example, in the morning the traffic is low 270 but gradually increases. Thus, the system starts with one pod that offers 6 GB per second throughput. In response to the traffic increases over time, the number of parallel pods are increased.

In FIG. 2, the capacity 250 of the system is higher than the real traffic demand 260, which results in a waste of energy. For example, the server is running even though the traffic uses half of the capacity from that server. Thus, as shown in FIG. 2, half of the energy from that server is wasted.

Figure 3:
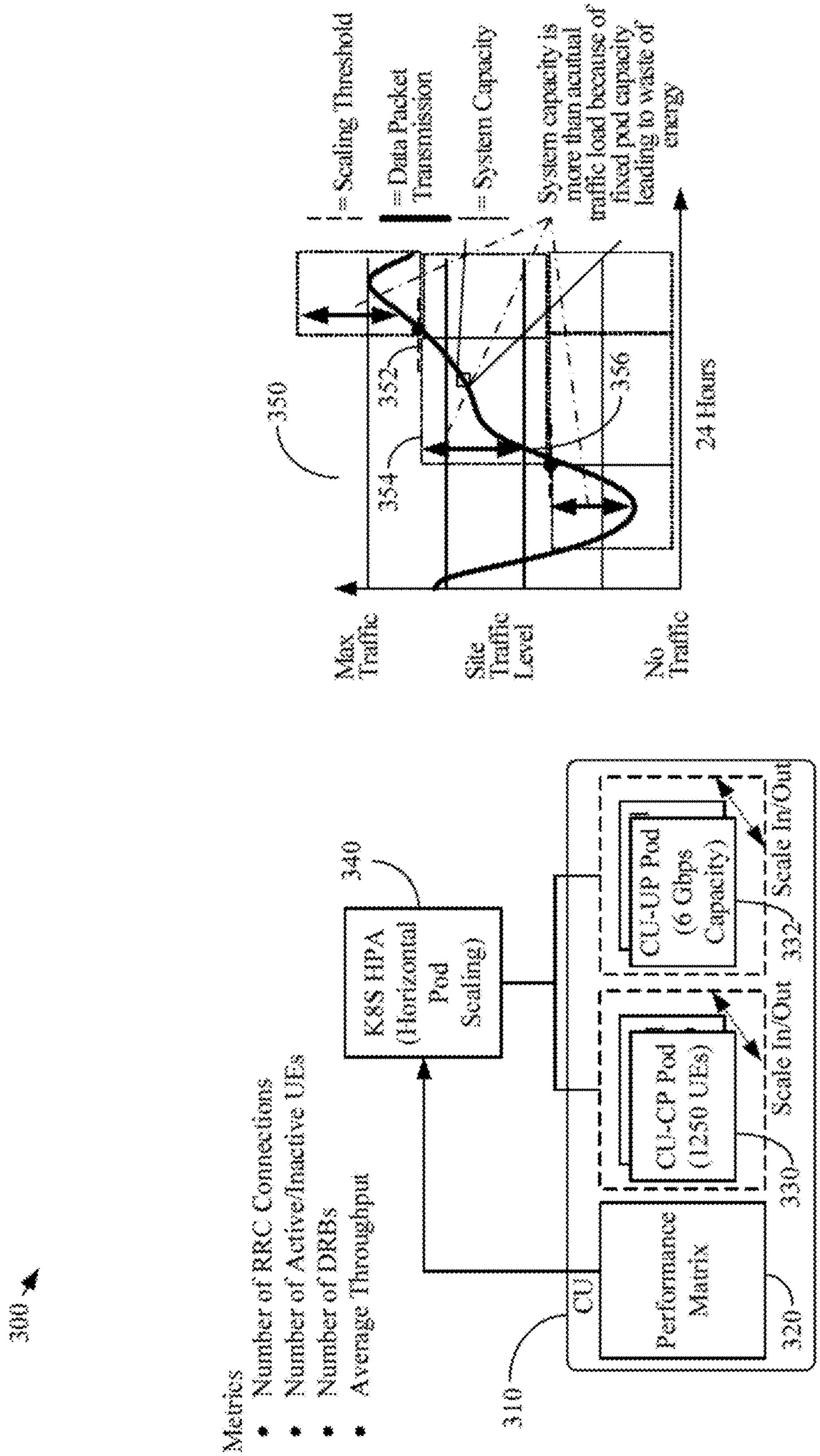
FIG. 3 illustrates horizontal pod scaling in Kubernetes applied to an Open-Centralized Unit (O-CU) 300 according to at least one embodiment.

FIG. 3 illustrates horizontal pod scaling in Kubernetes 300 applied to an Open-Centralized Unit (O-CU) 300 according to at least one embodiment.

In FIG. 3, the O-CU 310 captures Performance Metrics 320 in a performance matrix. The Performance Metrics 320 include a number of Radio Resource Control (RRC) connections, a number of active/inactive User Equipment (UEs), a number of Data Radio Bearers (DRBs), an average throughput, and the like. In FIG. 3, the pods to be scaled are the O-CU-CP pods 330 and O-CU-UP pods 332. The O-CU-CP pods 330 and O-CU-UP pods 332 are allocated with fixed CPU and memory resource and support fixed capacity, e.g., 1250 UEs per O-CU-CP pod 330 and 6 Gbps throughput per O-CU-UP pod 332, respectively. The O-CU-CP pod 330 or O-CU-UP pod 332 capacity is increased/decreased at a fixed step, leading to energy wasting when the system capacity is higher than the actual traffic demand in the network. External Performance Metrics 320 from the O-CU 310 are collected from the HPA 340 for making scaling decisions based on customized threshold configured.

A plot 350 of the data packet transmission traffic verses time is shown for 24 hours. The plot 350 shows a scaling threshold 352 and capacity 354 of the O-CU. O-CU capacity 354 is more than actual traffic load 356 because of a fixed pod capacity, e.g., 6 Gbps step, which is a waste of energy.

Figure 4:
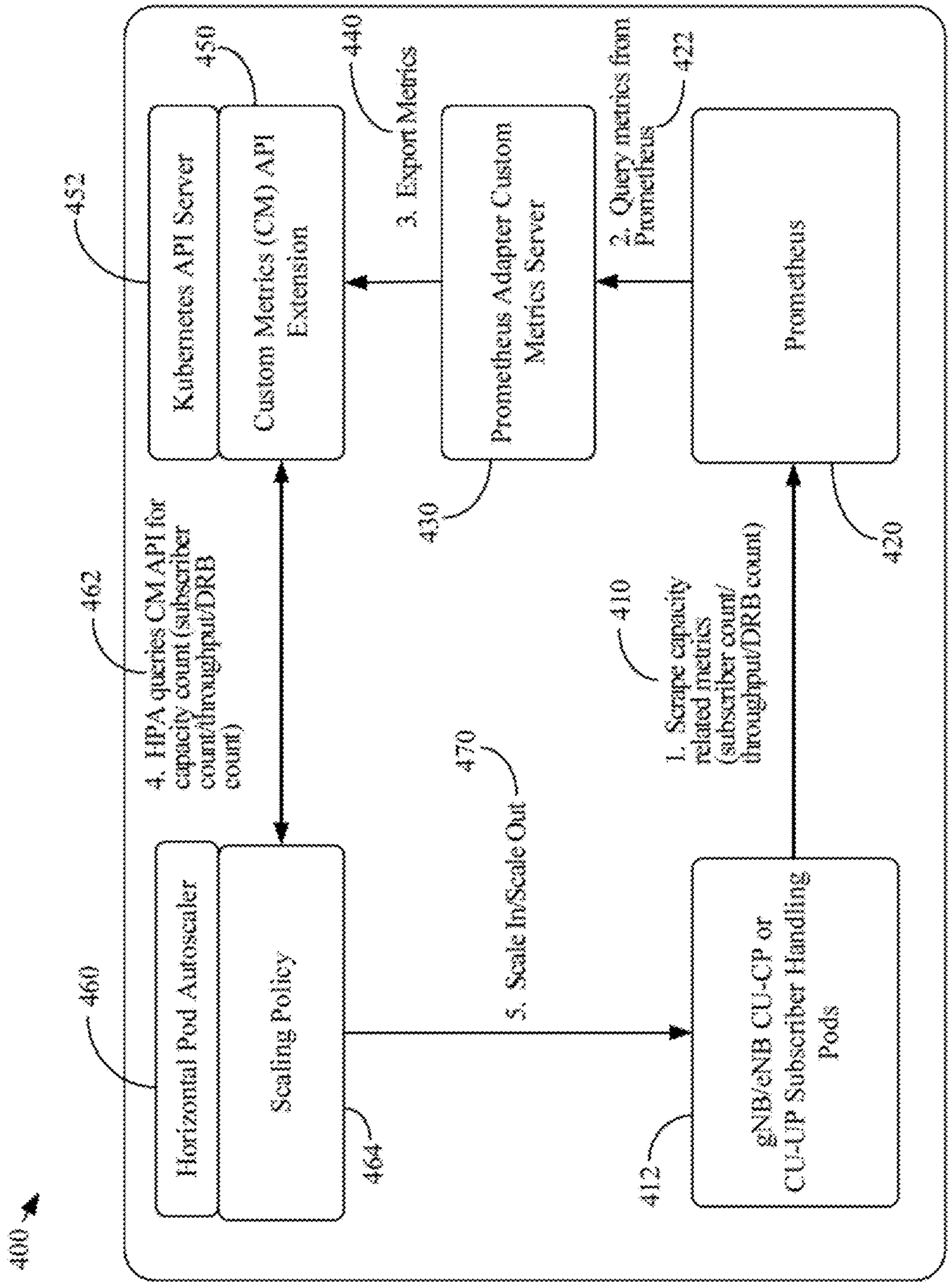
FIG. 4 illustrates a workflow for O-CU-CP or O-CU-UP horizontal autoscaling according to at least one embodiment.

FIG. 4 illustrates a workflow 400 for O-CU-CP or O-CU-UP horizontal autoscaling according to at least one embodiment.

In FIG. 4, Capacity Related Metrics are scraped 410 by a CU 412, e.g., one or more of a CU-Control Plane (CU-CP) or a CU-User Plance (CU-UP), to obtain subscriber count, throughput, DRB count, and the like.

An Event Monitor 420 (Prometheus) receives the Capacity Related Metrics 410 and provides a Query 422 via a Metrics Server 430, e.g., a Prometheus Adapter Custom Metric Server.

The Metrics 440 are ported to a Custom Metrics API extension 450, Custom Metrics (CM) API extension that is under control of a Kubernetes API server 452. A Horizontal Pod Autoscaler (HPA) 460 queries the CM API 450 for Capacity Count Data 462, e.g., subscriber count, throughput, DRB count, and the like. The HPA 460 refers to a Scaling Policy 464 and Scales In/Out 470 based on the capacity count data and the Scaling Policy 464.

Figure 5:
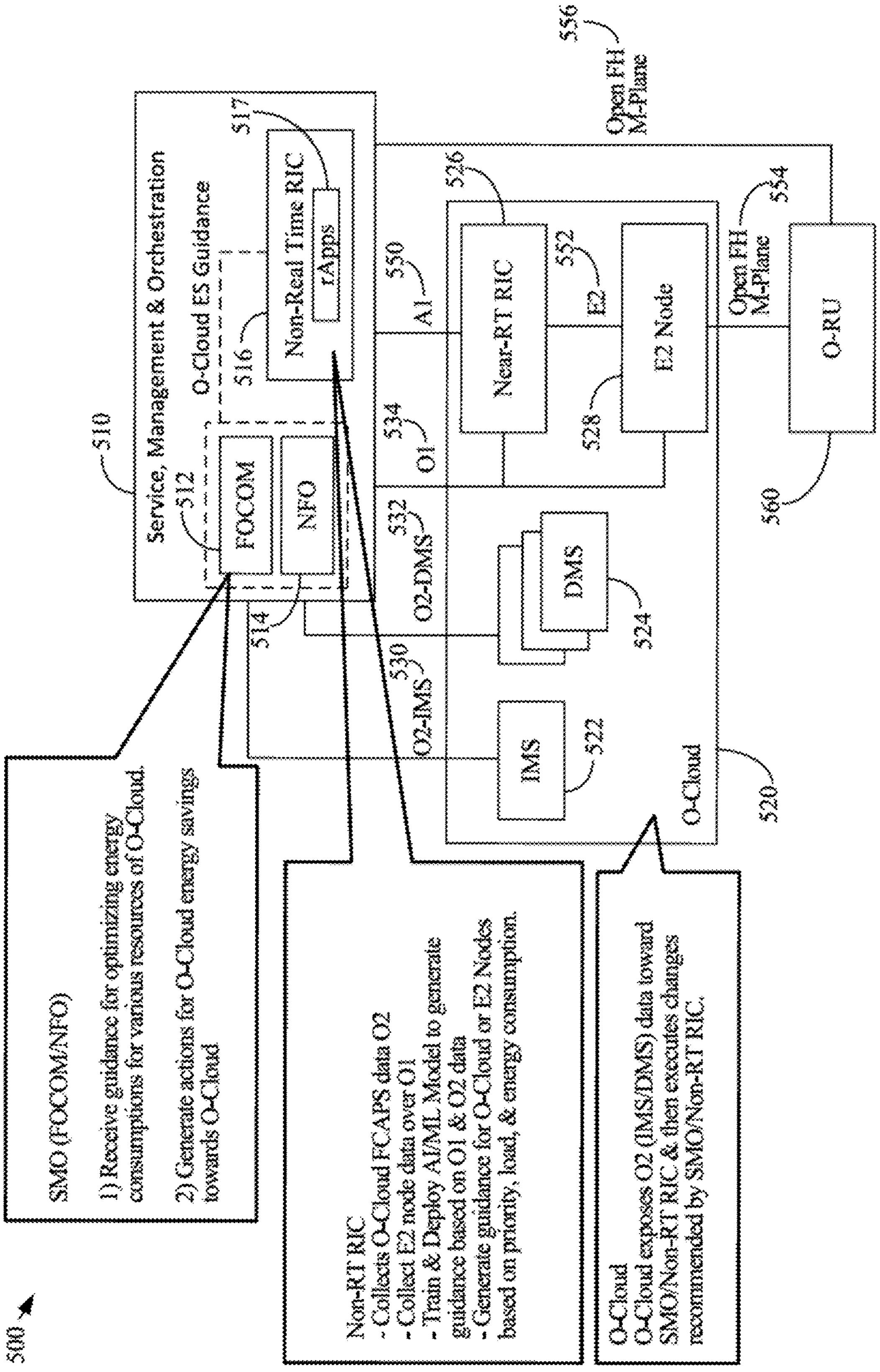
FIG. 5 illustrates cloud resource energy saving via a Non-RT RIC according to at least one embodiment.

FIG. 5 illustrates cloud resource energy saving via a Non-RT RIC 500 according to at least one embodiment.

In FIG. 5, a Service Management and Orchestration (SMO) 510 provisions a Non-RT RIC, Federated O-Cloud Orchestration and Management (FOCOM) 512, and Network Function Orchestrator (NFO) 514. FOCOM 512 is responsible for managing the infrastructure (e.g., Clouds, Data centers, Clusters, Resources, etc.) on which the Network Slices, Services and Functions are deployed. The NFO 514 orchestrates the RAN network functions on top of them.

An O-Cloud 520 includes an Interface Management Services (IMS) 522 coupled to the SMO 510 via an O2 interface 530. Deployment Management Services (DMS) 524 is coupled to the SMO 510 via an O2 interface 532. Near-RT RIC 526 and E2 Node 528 are coupled to SMO 510 via an O1 interface 534. Near-RT RIC 526 is coupled to Non-RT RIC 516 via an A1 interface 550. E2 Node 528 is coupled to Near-RT RIC 526 via an E2 interface 552. An O-RU 560 is coupled to E2 Node 528 of the O-Cloud 520 via an Open Fronthaul (FH) Management (M) Plane interface 554. SMO 510 is coupled to O-RU 560 via an Open Fronthaul (FH) M Plane interface 556.

Currently, control of scaling in/out of the O-Coud 520 involves the SMO 510 (FOCOM 512/NFO 514) that receives guidance for optimizing energy consumptions for various resources of the O-Cloud 520, and generates actions for energy saving towards O-Cloud 520. In O-RAN, however, the fixed step Horizontal Pod Autoscaling scheme has been adopted. The NFO 514 receives KPI metrics from the E2 nodes 538 and O-RUs 560 through the O1 interface 534 and the O2 interfaces 530, 532 for making scaling in/out decisions.

Non-RT RIC 516 collects O-Cloud Fault, Configuration, Accounting, Performance, Security (FCAPS) data over the O2 interfaces 530, 532, and collects data from E2 node 528 over the O1 interface 534. An Artificial Intelligence/Machine Learning (AI/ML) model is trained and deployed to generate guidance based on the data provided via the O2 interfaces 530, 532 and the O1 interface 534. Guidance for the O-Cloud 520 or E2 Nodes 528 is generated based on priority, load, and energy consumption. The Non-RT RIC 516 applies scaling commands to pods deployed in the O-Coud 520.

The O-Cloud 520 exposes the O2 data (IMS 533/DMS 534) toward SMO 510/Non-RT RIC 516, which then executes changes recommended by the SMO 510/Non-RT RIC 516.

The scaling in/out command made by the SMO 510 is sent to the DMS 524 via O2 interface 532 in the O-Cloud 520 which then control the number of pods for scaling in/out through the Kubernetes APIs. New NF deployment units are created on new pods (scale out), or NF deployment units are removed. The pod resource allocation and capacity are fixed resulting in the same energy wasting issue as discussed previously.

Figure 6:
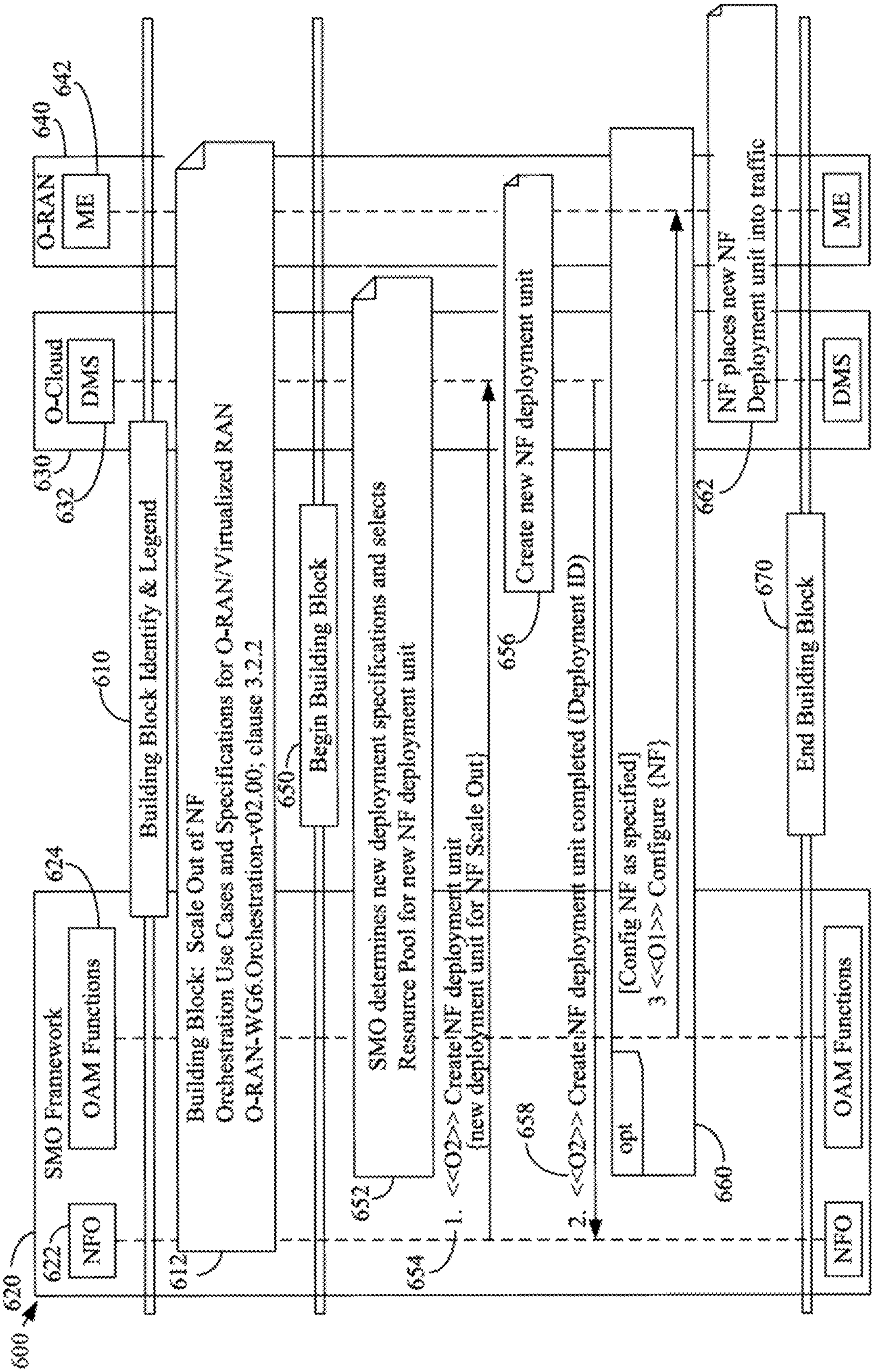
FIG. 6 illustrates a scale out of a Network Function (NF) according to at least one embodiment.

FIG. 6 illustrates a scale out of a Network Function (NF) 600 according to at least one embodiment.

In FIG. 6, the scale out orchestration use case from O-RAN.WG6.ORCH-USE-CASES-v05.00 is described. Orchestration uses cases and specified criteria for O-RAN/Virtualized RAN.

The Scale Out Network Function includes Building Block Identity & Legend 610, In FIG. 6, SMO Framework 620 includes Network Function Orchestrator (NFO) 622, and Operations and Maintenance (OAM) Functions 624. O-Cloud 630 includes Deployment Management Services (DMS) 632, and O-RAN 640 includes O-RAN Managed Element (ME) 642.

At Building Block Identity & Legend 610, network demand increases beyond a current NF capacity threshold, which triggers the SMO capacity Scale Out of NF 612.

At Begin Building Block 650, for a Scale Out of NF, SMO 620 determines based on the NF descriptor what NF deployment scaling is used to increase NF capacity. SMO 620 determines new deployment criteria and selects resource pool for new Network Function (NF) deployment unit 652.

Via the O2 interface, NFO 622 sends DMS 632 a Request Message 654 to create a new NF deployment unit for NF scale out.

DMS 632 creates a new NF deployment unit 656. DMS 632 sends NFO 622, via O2 interface, a message 658 indicating NF deployment unit creation has completed (via the O2 interface). OAM Functions 624 are able to send O-RAN Management Element 642, via O1 interface, a Configure NF message 660 for O-RAN Management Element 642 to configure NFs as changes are to be made. Thus, OAM Functions 624 in SMO Framework 620 communicates with the ME 642 to configure the NF via the O1 interface. New NF deployment unit is placed into traffic 662.

End Building Block 670 indicates the process then ends.

Figure 7:
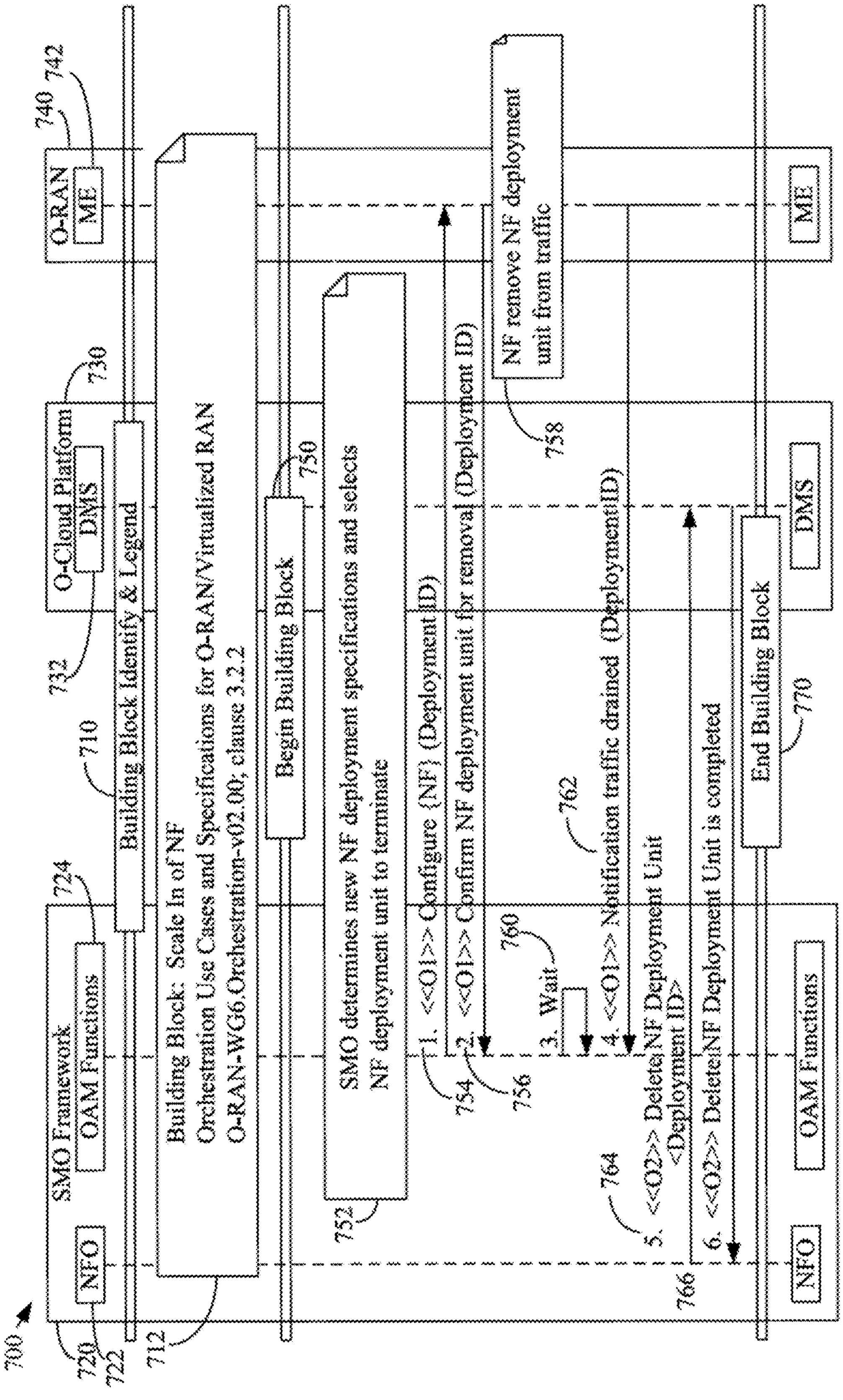
FIG. 7 illustrates a scaling in a Network Function (NF) Orchestration according to at least one embodiment.

FIG. 7 illustrates a scaling in a Network Function (NF) Orchestration 700 according to at least one embodiment.

In FIG. 7, SMO Framework 720 includes Network Function Orchestrator (NFO) 722, and Operations and Maintenance (OAM) Functions 724. O-Cloud 730 includes Deployment Management Services (DMS) 732, and O-RAN 740 includes O-RAN Managed Element (ME) 742.

At Building Block Identity & Legend 710, network demand decreases below a current NF capacity threshold, which triggers the SMO capacity Scale In of NF 712.

At Begin Building Block 750, for a Scale In of NF, SMO 720 determines new NF deployment specifications and selects NF deployment units to terminate 752. OAM Functions 724 sends ME 742, via an O1 interface, a Configure (NF) message (with Deployment ID) 754 to remove NF deployment units.

ME 742 responds, via the O1 interface, with a Confirm NF deployment unit for removal message 756 (with Deployment ID). ME 742 removes NF deployment unit from traffic 758.

OAM Functions 724 waits 760 for ME 742 to remove NF deployment units from traffic.

ME 742 sends OAM Functions 724 a Notification Message 762 that traffic for the NF has drained. NFO 722 sends DMS 732, via the O2 interface, a Delete Message 764 for DMS to delete the NF deployment unit (identified by a Deployment ID). The DMS 732 sends the NFO 722, via the O2 interface, a Confirmation Message 766 that the deletion of the NF deployment unit has been completed.

End Building Block 770 indicates the process then ends.

Figure 8:
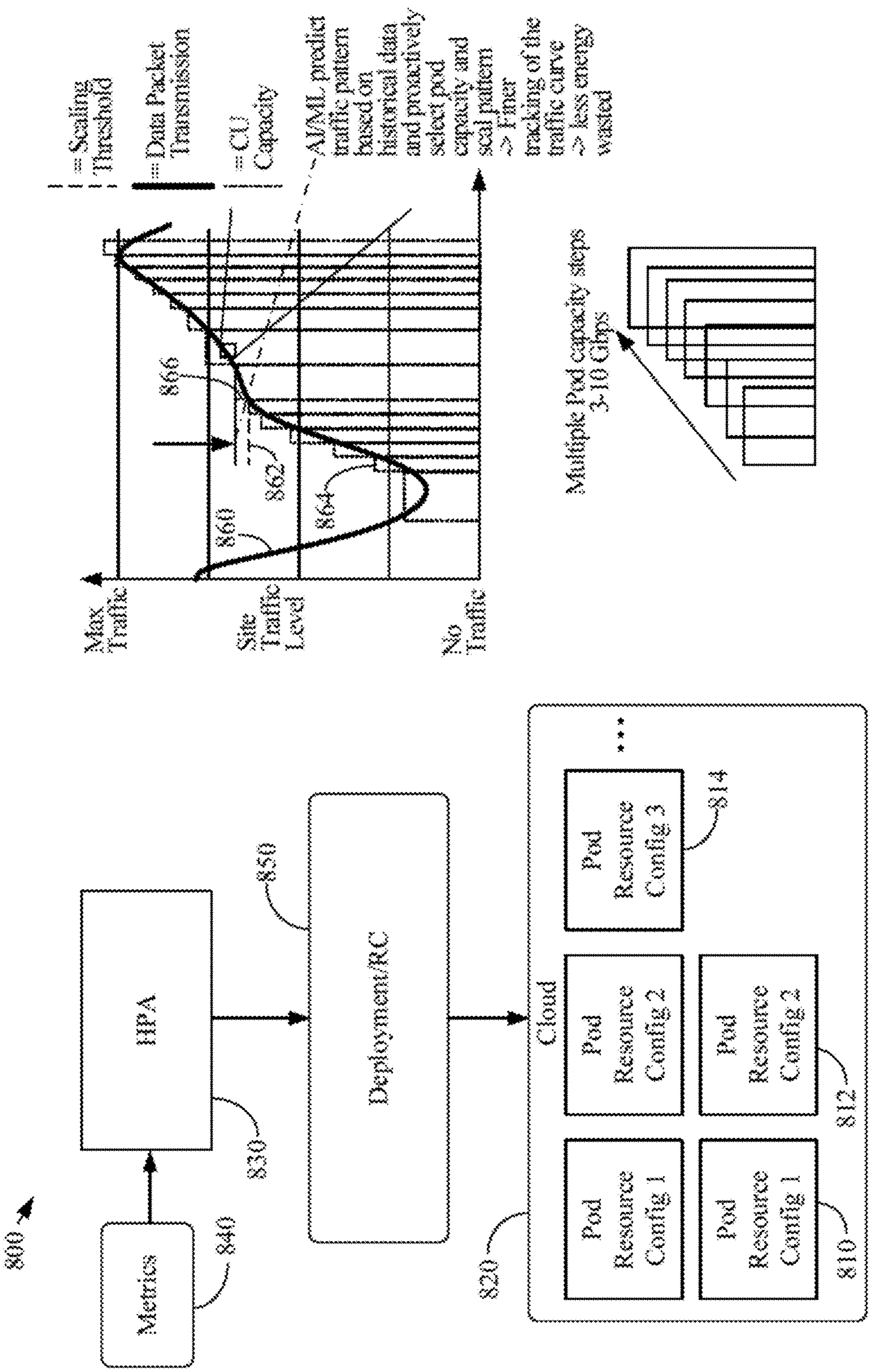
FIG. 8 illustrates a Horizontal Pod Autoscaling (HPA) according to at least one embodiment.

FIG. 8 illustrates a Horizontal Pod Autoscaling (HPA) 800 according to at least one embodiment.

In FIG. 8, instead of scaling the system up/down at a fixed capacity step with fixed pod resource allocation and capacity, multiple pod versions with different resource allocations and capacities are pre-configured for the HPA to select during horizontal autoscaling. As shown in FIG. 8, multiple versions of the of the pod are pre-generated and compiled, e.g., Pod Resource Configuration 1 810, Pod Resource Configuration 2 812, Pod Resource Configuration 3 814, and the like. The pods have a certain configuration, such that a pod is able to support a different capacity. For example, Pod Resource Configuration 1 812 is able to provide 3 GB per second throughput. A resource configuration tool is able to generate a pod with a slightly higher capacity, e.g., 60 GB per second. Thus, during the scaling instead of increasing the number of pods of the same version, e.g., the same configuration or same capacity, the controller is able to flexibly select the best version that meets the current demand. A version of the of the pods are gradually selected based on the demand so that the traffic curve is used to meet demand using finer granularity. The time, and therefore, the amount of energy that is wasted is reduced.

FIG. 8 shows 3 pod versions that are implemented at the same time during pre-deployment implementation, e.g., Pod Resource Configuration 1 810, Pod Resource Configuration 2 812, Pod Resource Configuration 3 814, and the like. The versions are provided to the Cloud 820, and the HPA 830 based on Metrics 840 is able to select the best version of the pods. This is similar to the vertical scaling where more CPU resources are allocated, or the CPU resources are reduced to change the capacity. However, vertical scaling is very challenging for the industry to achieve. Embodiments described herein achieve the dynamic capacity changes based on horizontal scaling where resources are not dynamically allocated to CPU, but the different version of the pod that was built previously are selected. An advantage is that vendors generate pods of a given capacity and pre-test the pods. Then, from the HPA, the pods are allocated based on the metrics. The best version of the pods are selected to fit the traffic curve so that energy usage is not wasted.

The HPA 830 receives Performance Metrics 840 from Kubernetes or from an external source from the cloud applications and measure the scaling conditions, e.g., the current and future traffic demand versus current system capacity. The HPA 830 then selects the best pod version with the best capacity match to be scaled in/out. As a result, system is able to track the actual traffic demand in a finer granularity instead of at a fixed step where the energy is wasted most of the time in response to the system capacity being higher than the actual traffic demand, i.e., the resource allocated is not fully utilized.

Metrics 840 are provided to HPA 830 and the HPA 830 adds or deletes pods according to pod capacity categories. Pods with varying resource allocations are able to be provisioned. Deployment/RC 850 performs autoscaling in/out. In FIG. 8, 2 Pod Resource Configuration 1 810 are shown. Two Pod Resource Configuration 2 812 are shown. One Pod Resource Configuration 3 814 is shown. For example, pods with Resource Configuration 1 810 are able to be provisioned with the least CPU and memory resources, pods with Resource Configuration 2 812 are able to be provisioned with more CPU and memory resources than Resource Configuration 1 810, and pods with Resource Configuration 3 814 are able to be provisioned with the largest CPU and memory resources.

The orchestrator (e.g., the NFO) requests the O-Cloud entity (e.g., the DMS) to scale out new NF deployment units, e.g., by creating additional pod(s), according to one or more of the pod configurations 810, 812, 814. In the request, the number of pods and the corresponding configuration index is indicated.

A plot 860 of the data packet transmission verses time is shown. A scaling threshold is 862 shown. AI/ML of the Non-RT RIC predict traffic patterns based on historical data and proactively selects pod capacity and scale patterns. The AIML is able to provide finer tracking 864 to the traffic curve, so that energy is not wasted 866.

The Horizontal Pod Autoscaling (HPA) 830 according to at least one embodiment is different than prior vertical autoscaling or the combination of horizontal and vertical autoscaling. In prior vertical scaling, the Vertical Pod Autoscaling (VPA) automatically allocate CPU and memory resource according to the traffic demand, which in not feasible in most real-world applications. Most cloud applications cannot scale up/down in capacity along with dynamic resource increase/decrease in run time due to many implementation reasons.

In contrast, the Horizontal Pod Autoscaling (HPA) 830 according to at least one embodiment allows different pod versions 810, 812, 814 with different resource allocation and capacity to be preconfigured in advance during compiling stage or the system initialization stage with performance fined tuned manually by application developers. The HPA 830 simply selects the right version with the best capacity fit in run time during autoscaling rather than relying on VPA to automatically allocate resource from the platform level.

During autoscaling, the pod capacity is to be properly selected to minimize the CPU and memory resource occupied for energy saving and also to ensure that the network performance meets the performance specifications without performance degradation. In order to achieve the optimum performance, the HPA 830 measures the current scaling related KPIs based on Performance Metrics 840 collected at the current time, as well as predicts the future changes of the KPIs. In addition, the scaling in/out decision also is to take into consideration the service quality specifications of different type of application traffics currently happening and that will happen in the network to make sure the service quality specifications are met. Therefore, an Artificial Intelligence/Machine Learning (AI/ML) based solution is able to be used to provide the best scaling performance.

Figure 9:
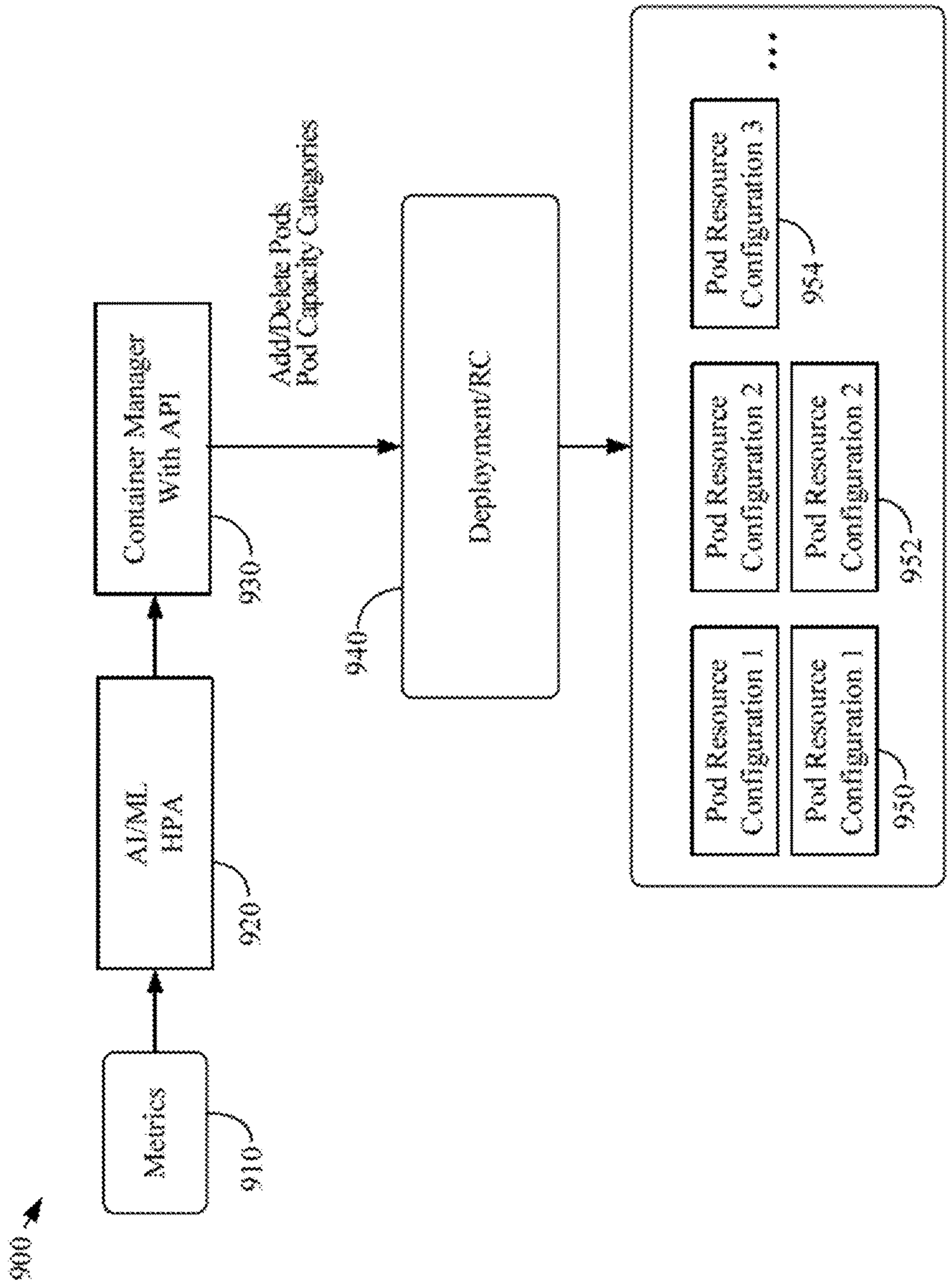
FIG. 9 illustrates AI/ML-based horizontal pod autoscaling with flexible pod selection according to at least one embodiment.

FIG. 9 illustrates AI/ML-based horizontal pod autoscaling with flexible pod selection 900 according to at least one embodiment.

In FIG. 9, Metrics 910 are provided to the AI/ML-based Horizontal Pod Autoscaling (HPA) 920. AI/ML-based HPA 920 measures and predicts the current and future scaling related KPIs based on the metrics. AI/ML-based HPA 920 proactively selects pod capacity and scaling in/out in terms of number of pods and pod capacity version selections for the optimum performance and QoS assurance. Requests are then provided to a Container Manager with an API 930, such as Kubernetes API. Container Manager with an API 930 instructs Deployment/RC 940 to scale pods (e.g., add/delete pods) according to pod capacity categories. Deployment/RC 940 performs the scaling in/out using Pod Resource Configuration 1 950, Pod Resource Configuration 1 952, Pod Resource Configuration 1 954, and the like.

Figure 10:
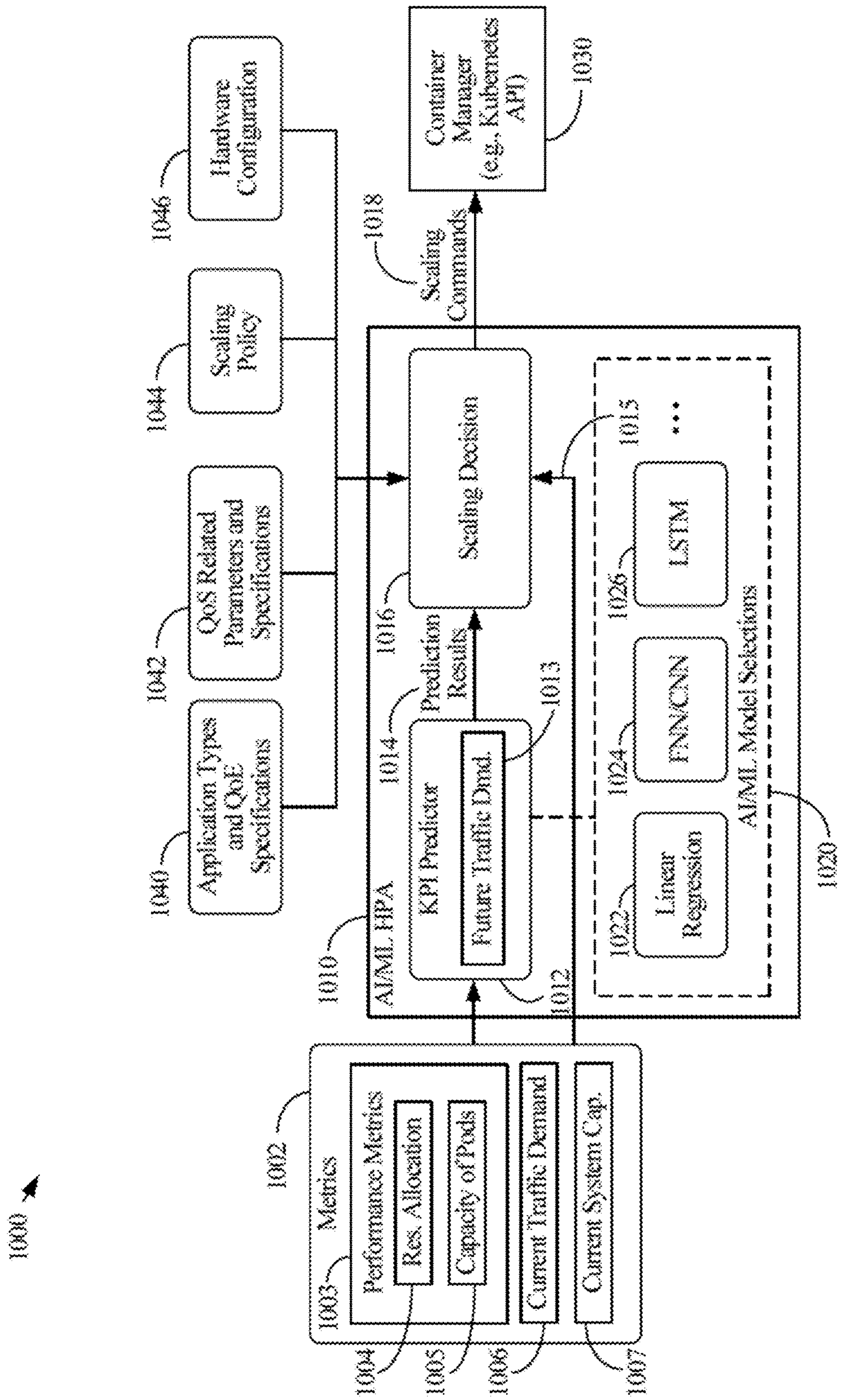
FIG. 10 illustrates an architecture of AI/ML-based architecture for providing horizontal auto scaling with flexible pos selection according to at least one embodiment.

FIG. 10 illustrates an architecture of AI/ML-based architecture 1000 for providing horizontal auto scaling with flexible pos selection according to at least one embodiment.

In FIG. 10, AI/ML-based HPA 1010 includes a KPI Predictor 1012 that includes an interface to receive Metrics 1002. Metrics 1002 include Performance Metrics 1003 including Resource Allocation Metrics 1004 and Capacity of Pods Metrics 1005, such as one or more of a number of Radio Resource Control (RRC) connections, a number of active/inactive User Equipment (UEs), a number of Data Radio Bearers (DRBs), or an average throughput. Metrics 1002 also includes Measured Current Traffic Demand 1006 and Current System Capacity 1007.

KPI Predictor 1002 predicts a Future Traffic Demand 1013 based on the Performance Metrics 1003, Measured Current Traffic Demand 1006, and Current System Capacity 1007.

AI/ML-based HPA 1010 is also coupled to AI/ML Models 1020 that are used by KPI Predictor 1012 of AI/ML HPA 1010 to predict a traffic trend (e.g., a Future Traffic Demand 1013) and Scaling Decision 1016 generates Scaling Commands 1018 in a proactive way.

The AI/ML HPA 1010 interacts with the Container Manager 1030, such as Kubernetes API. KPI Predictor 1012 receives the Metrics 1002 and uses AI/ML models 1020 to predict the Future Traffic Demand 1013 for scaling in/out decisions and provides Prediction Results 1014 to Scaling Decision 1016. Scaling Decision 1016 receives input from Application Type and Quality of Experience (QoE) Specifications 1040, Quality of Service (QoS) Related Parameters and Specifications 1042, Scaling Policy 1044 for increasing performance, increasing energy savings, minimizing hardware resource utilization, maximizing throughput, minimizing latency, and meeting latency budget, and Hardware Configuration 1046. Scaling Decision 1016 then generates Scaling Commands 1018 that are sent to the Container Manager 1030 to changes the scale, to changes policy versions, or to add new pods or delete pods via the Container Manager 1030. The AI/ML-based architecture 1000 provides scaling using the CU-CP and CU-UP.

The AI/ML HPA 1010 receives Metrics 1002 from the CU. The CU-UP has different configurations and the Container Manager 1030 automatically adds new pods or delete pods to provide the best pod version that provide the best capacity based on the Scaling Commands 1018.

Future KPIs are predicted by the KPI Predictor 1012 or based on flexible selection of AI/ML models 1020. KPI Predictor 1012 predicts which pod configuration provided improved performance, such as reducing energy consumption, reducing operating expenses, etc. based on future traffic estimation. The performance of multiple possibilities are evaluated. The Prediction Results 1013 that are generated based on the evaluation are used by the Scaling Decision 1016 to determine a final scaling decision, e.g., adding a pod configuration 1, pod configuration 2, pod configuration 3, and the like.

AI/ML Model Selections 1020 is able to include a Linear Regression model 1022, a Feedforward Neural Networks (FNN)/Convolutional Neural Networks (CNN) model 1024, a Long Short Term Memory (LSTM) model 1026, and the like. An AI/ML Model is selected from AI/ML Model Selections 1020 is selected based on the performance and capacity condition to be implemented. Prediction Result 1014 is generated by KPI Predictor 1012 based on the impact to the KPIs, e.g., what is the impact in response to adding a new pod having a certain version/configuration verses adding a different pod with a different configuration.

Scaling Decision 1016 generates Scaling Commands 1018 that are based on selection of a pod capacity and scaling in terms of a number of pods and a pod capacity version based on the Measured Current Traffic Demand 1006 and the Predicted Future Traffic Demand 1003 verses the Current System Capacity 1007 to provide optimal performance for the Current Traffic Demand 1006 and the Future Traffic Demand 1013 according to pod capacity categories. Scaling Decision 1016 generates Scaling Commands 1018 for the selected pod capacity and the selected scaling to provide fine grained scaling for optimizing energy consumption according to pod capacity categories. The impact includes the performance that is provided by the Prediction Result 1014 as implemented by Container Manager 1030 via Scaling Commands 1018 form Scaling Decision 1016.

The AI/ML model 1014 that is selected depends on the traffic curve. In response to the traffic curve being linear, traffic is easy to predict and a Linear Regression model 1022 is able to be used to predict the traffic. In some scenarios the traffic is not very linear, e.g., the curve goes up and down or includes significant variation making prediction more difficult. In these situations, the traffic is not as easy to predict, and a more advanced module, such as LSTM 1026, is to be used. AI/ML Model selection 1020 also depends on the availability of the data for training the AI/ML Models 1020. In response to there being less data to train the modules, then a simpler model is used, e.g., Linear Regression 1022. In response to there being a lot of data to train the AI/ML Models 1020, more advanced models are able to be used. For example, LSTM 1026 has much more complexity than Linear Regression 1022.

One way that AI/ML Model selection 1020 is able to be made is to use manual selection. An operator is able to use manual selection to provide KPI Predictor 1012 in certain site cell sites. The system trains an AI/ML Model 1020 and the operator selects the best model manually. However, in response to there being 50,000 cells in in a network, and at least some of the cells have a slightly different situation, then using manual selection is not feasible. In this case, the software or the system automatically selects the AI/ML Model 1020.

AI/ML-based HPA 1010 includes a AI/ML Scaling Decision 1016 that receives the current Metrics 1015 along with Prediction Results 1014, such as predicted metrics/KPIs, for making the final autoscaling decision on pod capacity and scale patterns based on various factors. The Scaling Decision 1016 also uses Application Type and Quality of Experience (QoE) Specifications 1040, Quality of Service (QoS) specifications of the applications 1042, Scaling Policy 1044 provided by the operator, e.g., best performance, best energy saving, minimum hardware resource utilization, maximum throughput, minimum latency, latency budget met, etc.), and the Hardware Configuration 1046 to provide input to Scaling Decision 1016. Scaling Policy 1044 is a condition or parameter received from the operators, such as whether scaling is to be more aggressive or less aggressive to provide the best performance and have the minimum risk of not having resources to meet the traffic demand. However, aggressive scaling is able to result in the best performance but with a waste of resources, wherein less aggressive scaling provides the best energy consumption, but at the risk of losing some performance. The operator that manages the cloud is able to adjust the service policy that influences the Scaling Decision 1016.

The Scaling Decision 1016 determines which pod selection provides the best performance.

Scaling Decision 1016 provides Scaling Commands 1018 (e.g., scale in/out commands) to Container Manager 1030 to add/delete pods with capacity version selection to fulfill the current and future traffic demand proactively based on pod capacity categories. Previously, pods with a fixed configuration (e.g . . . , 6 GHz) were implemented and pods were simply added or deleted. According to at least one embodiment, pods with different configurations are pre-generated and pre-compiled. For Example, there are pod configuration 1, pod configuration 2, pod configuration 3, etc., wherein pod 1 is 2 GB/s, pod 2 is 4 GB/s, pod 3 is 6 GB/s, and the like.

According to at least one embodiment, an Artificial Intelligent/Machine Learning (AI/ML)-based Horizontal Pod Autoscaler (HPA) is implemented. The AI/ML-based HPA includes a Non-Real-Time Radio Access Network Intelligent Controller (Non-RT RIC), wherein the Non-RT RIC uses rApps to apply the scaling commands to pods deployed in an Open-Cloud (O-Cloud) System. The performance metrics include performance metrics obtained by the Non-RT RIC by collecting O-Cloud Fault, Configuration, Accounting, Performance, Security (FCAPS) data over an O2 interface, collecting E2 node data over an O1 interface. The Non-RT RIC trains and deploys AI/ML models to generate scaling guidance for the O-Cloud or the E2 Nodes based on priority, load and energy consumption, and service quality specifications. The training and deploying the AI/ML models by the Non-RT RIC includes training and deploying at least one of a Linear Regression model, a Feedforward Neural Networks (FNN), a Convolutional Neural Networks (CNN) model, or a Long Short Term Memory model. The performance metrics regarding resource allocation and capacity of pods includes receiving one or more of a number of Radio Resource Control (RRC) connections, a number of active/inactive User Equipment (UEs), a number of Data Radio Bearers (DRBs), or an average throughput. Performance metrics regarding resource allocation and capacity of pods are received at the HPA. A current traffic demand is measured and a future traffic demand is predicted versus a current system capacity. A pod capacity and scaling are selected in terms of a number of pods and a pod capacity version based on the measured current traffic demand and the predicted future traffic demand verses the current system capacity to provide optimal performance for the current traffic demand and the future traffic demand according to pod capacity categories. The pod capacity and the scaling are selected in terms of the number of pods and pod capacity version selections based on the measured current traffic demand. The predicted future traffic demand includes tracking traffic demand using a fine granularity to match the current system capacity with actual traffic demand to match resource utilization with resource demand. Scaling commands are generated for the selected pod capacity and the selected scaling is provided to provide fine grained scaling for optimizing energy consumption according to pod capacity categories. The scaling commands are generated by a Scaling Decision based on data received from and Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, and meeting latency budget, and hardware configurations. The scaling commands are sent to a Kubernetes API to scale pods to fulfill the current traffic demand and the future traffic demand according to pod capacity categories. The sending the scaling commands are sent to the Kubernetes API to instruct Deployment/RC to scale pods according to pod capacity categories.

Figure 11:
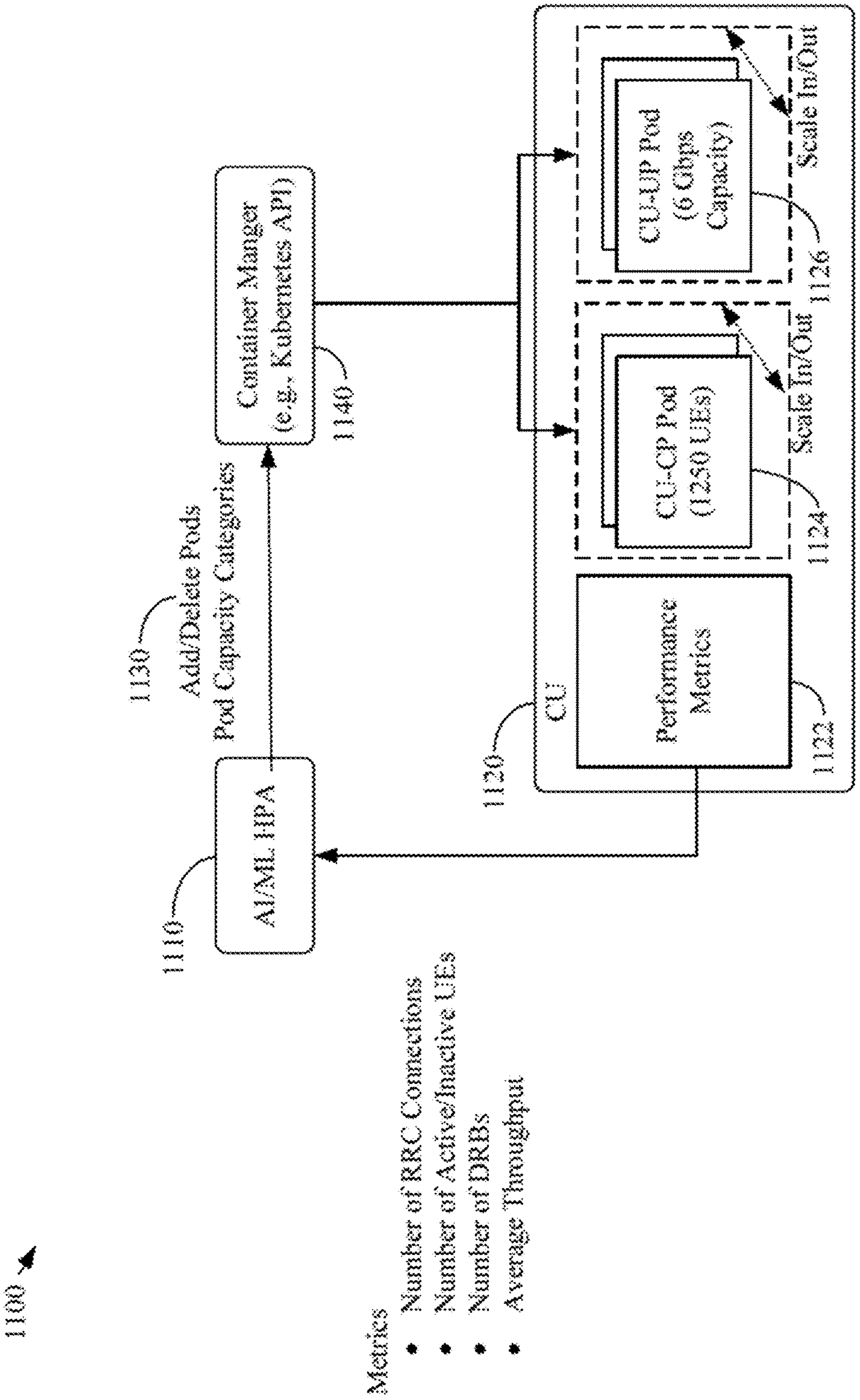
FIG. 11 illustrates an AI/ML-based HPA with flexible pod selection for an O-CU according to at least one embodiment.

FIG. 11 illustrates an AI/ML-based HPA with flexible pod selection for an O-CU 1100 according to at least one embodiment.

In FIG. 11, as described above, the AI/ML HPA 1110 collect from CU 1120 Performance Metrics 1122, e.g., from the O-CU-CP pods 1124 and O-CU-UP pods 1126. Performance Metrics 1122 include a number of Radio Resource Control (RRC) connections, a number of active/inactive User Equipment (UEs), a number of Data Radio Bearers (DRBs), an average throughput, and the like.

The AI/ML HPA 1110 measures and predicts the current and future scaling related conditions, makes the optimum scaling decisions taking in consideration of the various factors discussed above.

AI/ML HPA 1110 provides Scaling Commands 1130 to Container Manager 1140, e.g., Kubernetes API, to add/delete pods according to pod capacity categories. Container Manager 1140 controls scaling in/out of the O-CU-CP pods 1124 and O-CU-UP pods 1126 in the O-CU 1120.

Figure 12:
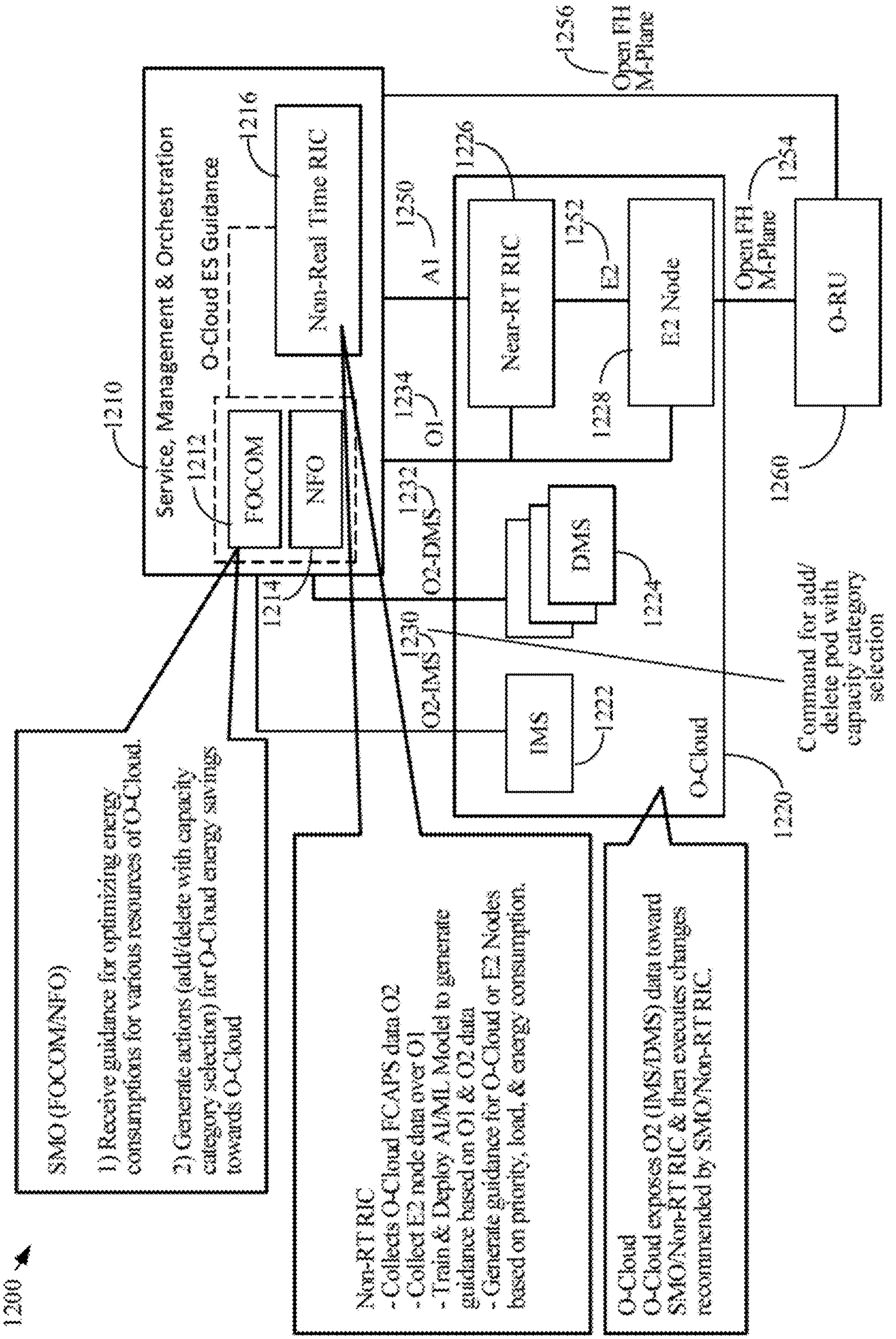
FIG. 12 illustrates AI/ML-based HPA with flexible pod selection for O-Cloud according to at least one embodiment.

FIG. 12 illustrates AI/ML-based HPA with flexible pod selection for O-Cloud 1200 according to at least one embodiment.

In FIG. 12, the autoscaling solution is applied to the O-Cloud 1220 where the same AI/ML HPA function is implemented in the Non-RT RIC 1216 as rApps.

The Non-RT RIC 1216 collects O-Cloud FCAPS data over O2 interface and collect data from E2 node 1228 over O1 1234, training and deploying AI/ML models and generate scaling guidance for O-Cloud 1220 or E2 Nodes 1228 based on priority, load and energy consumption, and service quality specifications.

A SMO 1210 provisions a Non-RT RIC 1216, Federated O-Cloud Orchestration and Management (FOCOM) 1212, and Network Function Orchestrator (NFO) 1214. An O-Cloud 1220 includes an Interface Management Services (IMS) 1222 coupled to the SMO 1210 vi an O2 interface 1230. Deployment Management Services (DMS) 1224 is coupled to the SMO 1210 via an O2 interface 1232. Near-RT RIC 1226 and E2 Node 1228 are coupled to SMO 1210 via an O1 interface 1234. Near-RT RIC 1226 is coupled to Non-RT RIC 1226 via an A1 interface 1250. E2 Node 1228 is coupled to Near-RT RIC 1226 via an E2 interface 1252. An O-RU 1260 is coupled to E2 Node 1228 of the O-Cloud 1220 via an Open Fronthaul (FH) Management (M) Plane interface 1254. SMO 1210 is coupled to O-RU 1260 via an Open Fronthaul (FH) M Plane interface 1256.

SMO 1210(FOCOM 1212/NFO 1214) receives guidance from the Non-RT RIC 1216 for optimizing energy consumption for various resources of the O-Cloud 1220, and generates actions for O-Cloud 1220 energy saving towards O-Cloud 1220 based on commands to add/delete pods with capacity category selection. Commands to add/delete pods with capacity category selection are provided from SMO 1210 to O-Cloud 1220 via O2 interfaces 1230, 1232.

Non-RT RIC 1216 collects O-Cloud FCAPS data over the O2 interfaces 1230, 1232, and collects data from E2 node 1228 over the O1 interface 1234. An AI/ML model is trained and deployed to generate guidance based on the O1 and O2 data. Guidance for the O-Cloud 1220 or E2 Nodes 1228 is generated based on priority, load, and energy consumption. The O-Cloud 1220 exposes the O2 data (IMS 1222/DMS 1224) toward SMO 1210/Non-RT RIC 1216, which then executes changes recommended by the SMO 1210/Non-RT RIC 1216.

Figure 13:
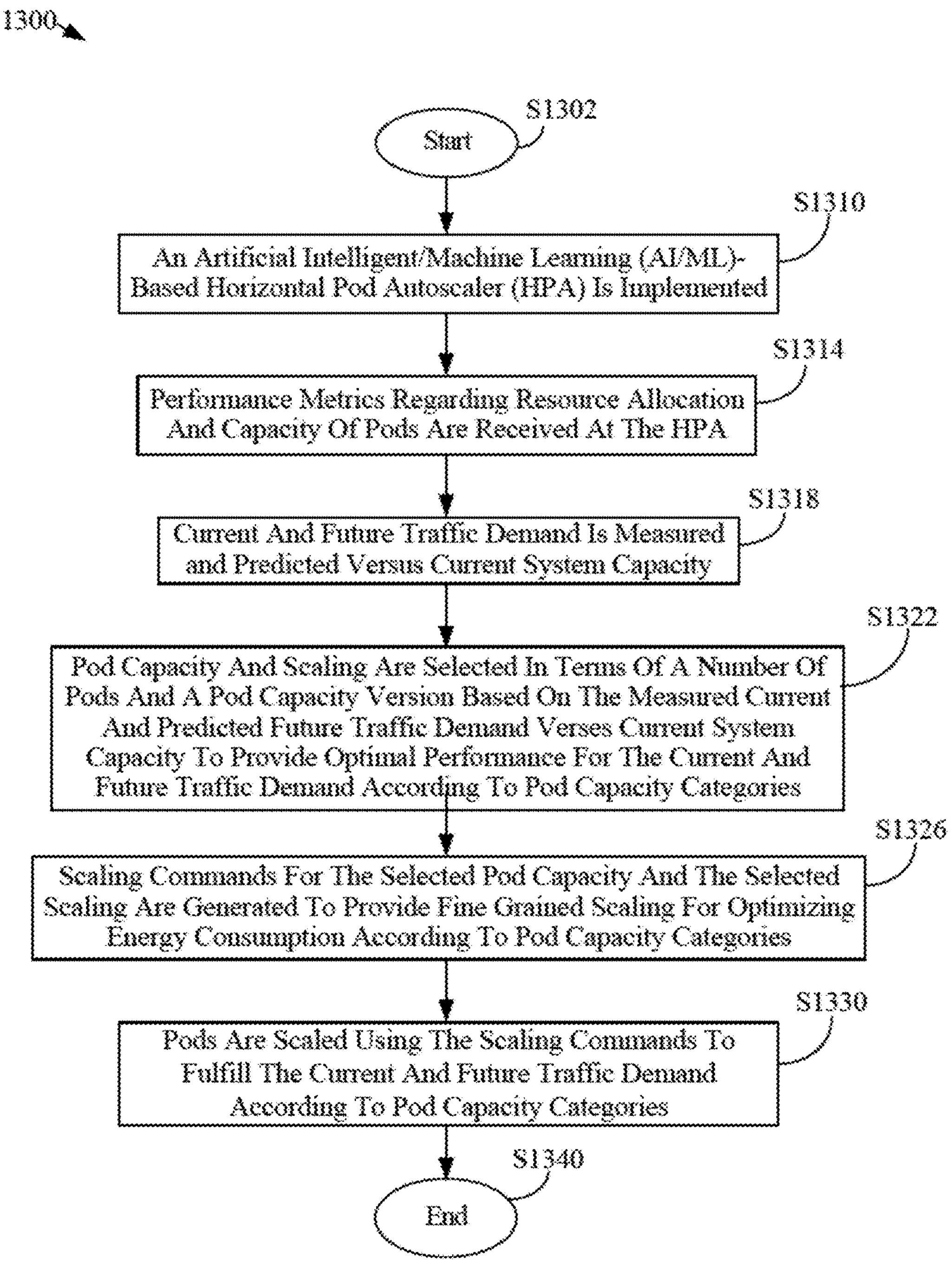
FIG. 13 is a flowchart of a method for saving energy through flexible Kubernetes pod capacity selection during horizontal pod autoscaling (HPA) according to at least one embodiment.

FIG. 13 is a flowchart 1300 of a method for saving energy through flexible Kubemetes pod capacity selection during horizontal pod autoscaling (HPA) according to at least one embodiment.

In FIG. 13, the method starts S1302 and an Artificial Intelligent/Machine Learning (AI/ML)-based Horizontal Pod Autoscaler (HPA) is implemented S1310. The implementing the AI/ML-based HPA includes implementing a Non-Real-Time Radio Access Network Intelligent Controller (Non-RT RIC). The Non-RT RIC uses rApps to apply scaling commands to pods deployed in an Open-Cloud (O-Cloud) System. The Performance Metrics received by the Non-RT RIC includes collection of O-Cloud Fault, Configuration, Accounting, Performance, Security (FCAPS) data over an O2 interface, E2 node data over an O1 interface. The Non-RT RIC trains and deploys AI/ML models to generate scaling guidance for the O-Cloud or the E2 Nodes based on priority, load and energy consumption, and service quality specifications.

Performance metrics regarding resource allocation and capacity of pods are received at the HPA S1314. Receipt of the performance metrics includes obtaining performance metrics by the Non-RT RIC by collecting O-Cloud Fault, Configuration, Accounting, Performance, Security (FCAPS) data over an O2 interface, collecting E2 node data over an O1 interface. The Non-RT RIC trains and deploys AI/ML models to generate scaling guidance for the O-Cloud or the E2 Nodes based on priority, load and energy consumption, and service quality specifications. The training and deploying the AI/ML models by the Non-RT RIC includes training and deploying at least one of a Linear Regression model, a Feedforward Neural Networks (FNN), a Convolutional Neural Networks (CNN) model, or a Long Short Term Memory (LSTM) model. The performance metrics regarding resource allocation and capacity of pods includes one or more of a number of Radio Resource Control (RRC) connections, a number of active/inactive User Equipment (UEs), a number of Data Radio Bearers (DRBs), or an average throughput.

Current and future traffic demand is measured and predicted versus current system capacity S1318. Pod capacity and scaling are selected in terms of a number of pods and a pod capacity version based on the measured current and predicted future traffic demand verses current system capacity to provide optimal performance for the current and future traffic demand according to pod capacity categories. The selecting the pod capacity and the selecting the scaling in terms of the number of pods and pod capacity version selections based on the measured current and the predicted future traffic demand includes tracking traffic demand using a fine granularity to match a system capacity with actual traffic demand to match resource utilization with resource demand.

Pod capacity and scaling are selected in terms of a number of pods and a pod capacity version based on the measured current and predicted future traffic demand verses current system capacity to provide optimal performance for the current and future traffic demand according to pod capacity categories S1322. Pod capacity and scaling are used to track traffic demand using a fine granularity to match the current system capacity with actual traffic demand to match resource utilization with resource demand.

Scaling commands for the selected pod capacity and the selected scaling are generated to provide fine grained scaling for optimizing energy consumption according to pod capacity categories S1326. The scaling commands are generated by a Scaling Decision based on data received from and Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, and meeting latency budget, and hardware configurations.

Pods are scaled using the scaling commands to fulfill the current and future traffic demand according to pod capacity categories S1330. The scaling commands are sent to the Kubernetes API to instruct Deployment/RC to scale pods according to pod capacity categories.

The process then terminates S1340.

At least one embodiment of the method for saving energy through flexible Kubernetes pod capacity selection during horizontal pod autoscaling (HPA) includes implementing an Artificial Intelligent/Machine Learning (AI/ML)-based horizontal pod autoscaler (HPA), receiving, at the HPA, performance metrics regarding resource allocation and capacity of pods, measuring a current traffic demand and predicting a future traffic demand versus a current system capacity, selecting a pod capacity and selecting scaling in terms of a number of pods and a pod capacity version based on the measured current traffic demand and the predicted future traffic demand verses the current system capacity to provide optimal performance for the current traffic demand and the future traffic demand according to pod capacity categories, generating scaling commands for the selected pod capacity and the selected scaling to provide fine grained scaling for optimizing energy consumption according to pod capacity categories, and based on the scaling commands, scaling pods to fulfill the current traffic demand and the future traffic demand according to pod capacity categories.

Figure 14:
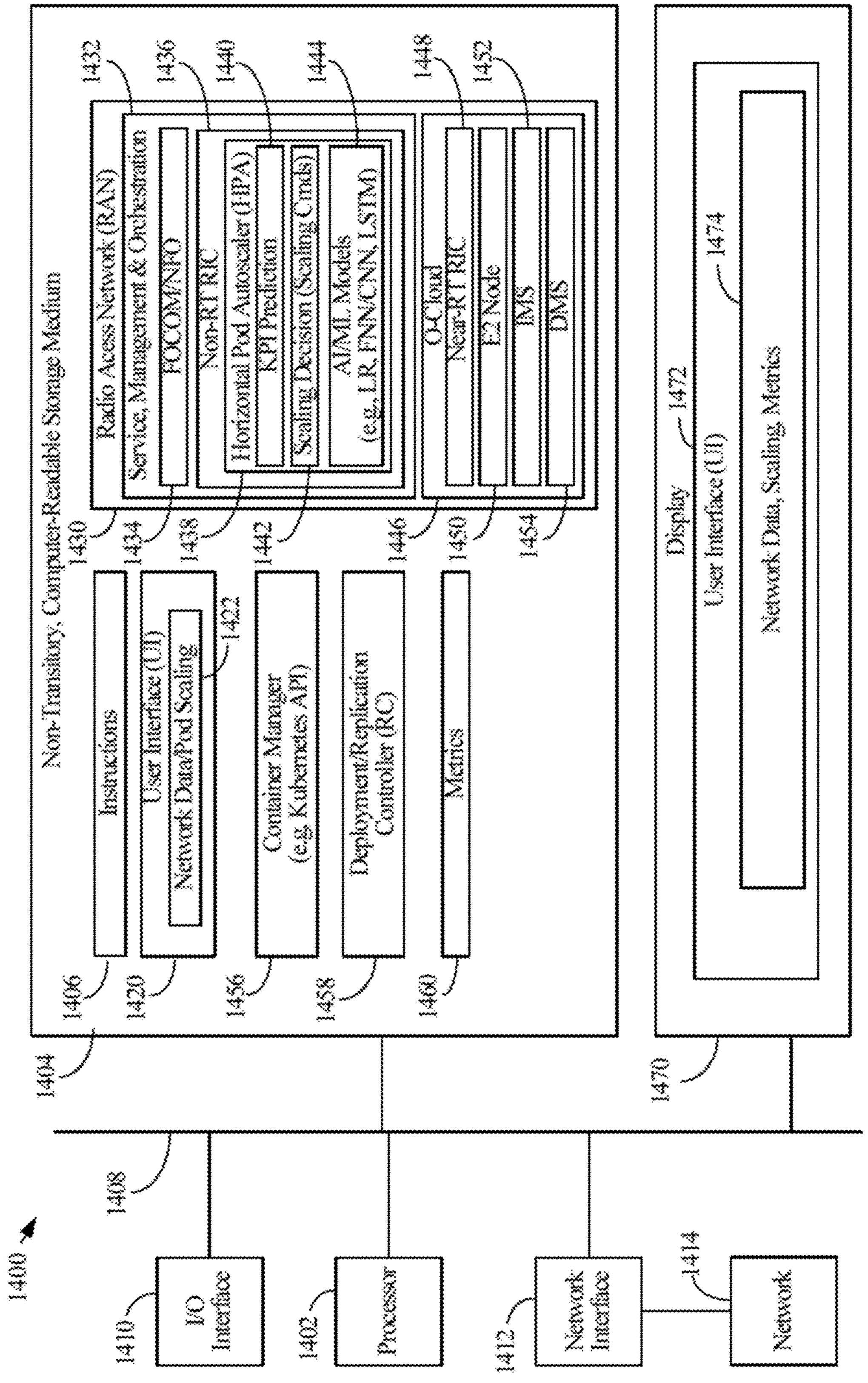
FIG. 14 is a high-level functional block diagram of a processor-based system according to at least one embodiment.

FIG. 14 is a high-level functional block diagram of a processor-based system 1400 according to at least one embodiment.

In at least one embodiment, processing circuitry provides for energy saving through flexible Kubernetes pod capacity selection during horizontal pod autoscaling (HPA). Processing circuitry implements for energy saving through flexible Kubernetes pod capacity selection during horizontal pod autoscaling (HPA) using Processor 1402. Processing circuitry also includes a Non-Transitory, Computer-Readable Storage Medium 1404 that is used to implement for energy for saving energy through flexible Kubernetes pod capacity selection during horizontal pod autoscaling (HPA) through flexible Kubernetes pod capacity selection during horizontal pod autoscaling (HPA). Non-Transitory, Computer-Readable Storage Medium 1404, amongst other things, is encoded with, i.e., stores, Instructions, i.e., computer program code, that are executed by Processor 1402 causes Processor 1402 to perform operations for saving energy through flexible Kubernetes pod capacity selection during horizontal pod autoscaling (HPA). Execution of Instructions 1406 by Processor 1402 represents (at least in part) an application which implements at least a portion of the methods described herein in accordance with one or more embodiments (hereinafter, the noted processes and/or methods).

Processor 1402 is electrically coupled to Non-Transitory, Computer-Readable Storage Medium 1404 via a Bus 1408. Processor 1402 is electrically coupled to an Input/Output (I/O) Interface 1410 by Bus 1408. A Network Interface 1412 is also electrically connected to Processor 1402 via Bus 1408. Network Interface 1412 is connected to a Network, so that Processor 1402 and Non-Transitory, Computer-Readable Storage Medium 1404 connect to external elements via Network. Processor 1402 is configured to execute Instructions 1406 encoded in Non-Transitory, Computer-Readable Storage Medium 1404 to cause processing circuitry to be usable for performing at least a portion of the processes and/or methods. In one or more embodiments, Processor 1402 is a Central Processing Unit (CPU), a multi-processor, a distributed processing system, an Application Specific Integrated Circuit (ASIC), and/or a suitable processing unit.

Processing circuitry includes I/O Interface. I/O interface 1410 is coupled to external circuitry. In one or more embodiments, I/O Interface 1410 includes a keyboard, keypad, mouse, trackball, trackpad, touchscreen, and/or cursor direction keys for communicating information and commands to Processor 1402.

Processing circuitry also includes Network Interface 1412 coupled to Processor 1402.

Network Interface 1412 allows processing circuitry to communicate with Network 1414, to which one or more other computer systems are connected. Network Interface 1412 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry is configured to receive information through I/O Interface 1410. The information received through I/O Interface 1410 includes one or more of instructions, data, design rules, libraries of cells, and/or other parameters for processing by Processor 1402. The information is transferred to Processor 1402 via Bus 1408. Processing circuitry is configured to receive information related to a User Interface (UI) 1420 through I/O Interface. The information is stored in Non-Transitory, Computer-Readable Storage Medium 1404 as UI 1420 for Network Data/Pod Scaling 1422.

In one or more embodiments, one or more Non-Transitory, Computer-Readable Storage Medium 1404 having stored thereon Instructions 1406 (in compressed or uncompressed form) that are able to be used to program a computer, processor, or other electronic device) to perform processes or methods described herein. The one or more Non-Transitory, Computer-Readable Storage Medium 1404 include one or more of an electronic storage medium, a magnetic storage medium, an optical storage medium, a quantum storage medium, or the like.

For example, the Non-Transitory, Computer-Readable Storage Medium 1404 includes, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Medium 1404 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1404 stores configured to cause Processor 1402 to perform at least a portion of the processes and/or methods for saving energy through flexible Kubernetes pod capacity selection during horizontal pod autoscaling (HPA). In one or more embodiments, Non-Transitory, Computer-Readable Storage Medium 1404 also stores information, such as algorithm which facilitates performing at least a portion of the processes and/or methods for saving energy through flexible Kubernetes pod capacity selection during horizontal pod autoscaling (HPA). Accordingly, in at least one embodiment, Processor 1402 executes Instructions 1406 stored on the one or more Non-Transitory, Computer-Readable Storage Medium 1404 to implement an Artificial Intelligent/Machine Learning (AI/ML)-based Horizontal Pod Autoscaler (HPA) 1438 for energy saving through flexible Kubernetes pod capacity selection during autoscaling. Radio Access Network (RAN) 1430 includes a Service, Management & Orchestration (SMO) Platform 1432.

The SMO Platform 1432 includes FOCOM/NFO 1434 and Non-Real-Time RAN Intelligent Controller (Non-RT RIC) 1436. HPA 1438 is implemented by the Non-RT RIC 1436. The HPA 1438 includes a KPI Prediction 1440 that receives Metrics 1460 regarding resource allocation and capacity of pods. A current traffic demand is measured and a future traffic demand versus a current system capacity is predicted by HPA 1438. KPI Prediction 1440 predicts current and further demand for the pods. Non-RT RIC 1436 uses rApps to apply the scaling commands to pods deployed in an Open-Cloud (O-Cloud) System. HPA 1438 receives Metrics 1460 that include 0-Cloud Fault, Configuration, Accounting, Performance, Security (FCAPS) data collected over an O2 interface, and data from E2 Node 1450 collected over an O1 interface. The HPA 1438 also includes a Scaling Decision 1442 that generates the scaling commands for the selected pod capacity and the selected scaling to provide fine grained scaling for optimizing energy consumption according to pod capacity categories based on input from the KPI Prediction 1440 and the Metrics 1460. Scaling Decision 1442 selects a pod capacity and scaling in terms of a number of pods and a pod capacity version based on the measured current traffic demand and the predicted future traffic demand verses the current system capacity to provide optimal performance for the current traffic demand and the future traffic demand according to pod capacity categories.

Metrics 1460 also includes data such as a Number of RRC Connections, a Number of Active/Inactive UEs, a Number of DRBs, an Average Throughput, and the like. Scaling Decision 1442 also receives data regarding Application Types & QoE Specifications, QoS Related Parameters & Specifications, Scaling Policy, and Hardware Configurations. The Non-RT RIC 1436 trains and deploys AI/ML models to generate scaling guidance for the O-Cloud or the E2 Nodes based on priority, load and energy consumption, and service quality specifications. The AI/ML Models 1444 are used by the KPI Prediction 1440 to predict current and further demand for the pods. The AI/ML Models 1444 include prediction models such as Linear Regression, FNN/CNN, LSTM, or the like. The RAN 1430 also includes an Open-Cloud (O-Cloud) 1446.

The O-Cloud 1446 includes a Near-Real-Time RIC (Near-RT RIC) 1448, one or more E2 Nodes 1450, Interface Management Services (IMS) 1452, and Deployment Management Services (DMS) 1454. Scaling Decision 1442 sends the scaling commands to a Container Manager having an API 1456, e.g., Kubernetes API, to scale pods to fulfill the current traffic demand and the future traffic demand according to pod capacity categories. Container Manager 1456 supports scaling of pods based on the scaling commands received from the HPA 1438. A Deployment/Replication Controller (RC) 1458 implements the scaling commands to add or delete pods. A Display 1470 presents a User Interface (UI) 1472. UI 1472 is used to display Network Data, Scaling, Metrics 1474, and other such data for implementing a horizontal pod autoscaling (HPA) for providing flexible Kubernetes pod capacity selection for saving energy.

Embodiments described herein provide method that provides one or more advantages. For example, energy is saved in the cloud data center for significant Operating Expense (OPEX) saving and CO2 emission reduction. In 5G cellular network, 20-40% percent of OPEX is from the energy bills, and 20-30% of the energy consumption occurs in the cloud data center deploying O-DUs, O-CUs, core networks, applications, and management services. Furthermore, according to the statistics, 2% of the CO2 emissions come from the mobile network in the world, which is a significant number. Thus, an important objective is to reduce CO2 emissions.

An aspect of this description is directed to a method [1] for saving energy through flexible Kubernetes pod capacity selection during horizontal pod autoscaling (HPA), includes implementing an Artificial Intelligent/Machine Learning (AI/ML)-based horizontal pod autoscaler (HPA), receiving, at the HPA, performance metrics regarding resource allocation and capacity of pods, measuring a current traffic demand and predicting a future traffic demand versus a current system capacity, selecting a pod capacity and selecting scaling in terms of a number of pods and a pod capacity version based on the measured current traffic demand and the predicted future traffic demand verses the current system capacity to provide optimal performance for the current traffic demand and the future traffic demand according to pod capacity categories, generating scaling commands for the selected pod capacity and the selected scaling to provide fine grained scaling for optimizing energy consumption according to pod capacity categories, and based on the scaling commands, scaling pods to fulfill the current traffic demand and the future traffic demand according to pod capacity categories.

The method described in [1], wherein the implementing the AI/ML-based HPA includes implementing a Non-Real-Time Radio Access Network Intelligent Controller (Non-RT RIC), wherein the Non-RT RIC uses rApps to apply the scaling commands to pods deployed in an Open-Cloud (O-Cloud) System, and wherein the receiving the performance metrics includes obtaining performance metrics by the Non-RT RIC by collecting O-Cloud Fault, Configuration, Accounting, Performance, Security (FCAPS) data over an O2 interface, collecting E2 node data over an O1 interface, and wherein the Non-RT RIC trains and deploys AI/ML models to generate scaling guidance for the O-Cloud or the E2 Nodes based on priority, load and energy consumption, and service quality specifications.

The method described in any of [1] to [2], wherein the training and deploying the AI/ML models by the Non-RT RIC includes training and deploying at least one of a Linear Regression model, a Feedforward Neural Networks (FNN), a Convolutional Neural Networks (CNN) model, or a Long Short Term Memory model.

The method described in any of [1] to [3], wherein the scaling commands are generated by a Scaling Decision based on data received from and Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, and meeting latency budget, and hardware configurations.

The method described in any of [1] to [4], wherein the receiving, at the HPA, performance metrics regarding resource allocation and capacity of pods includes receiving one or more of a number of Radio Resource Control (RRC)

connections, a number of active/inactive User Equipment (UEs), a number of Data Radio Bearers (DRBs), or an average throughput.

The method described in any of [1] to [5], wherein the sending the scaling commands to the Container Manager includes sending the scaling commands to the Container Manager to instruct Deployment/Replication Controller (RC) to scale pods according to pod capacity categories.

The method described in any of [1] to [6], wherein the selecting the pod capacity and the selecting the scaling in terms of the number of pods and pod capacity version selections based on the measured current traffic demand and the predicted future traffic demand includes tracking traffic demand using a fine granularity to match the current system capacity with actual traffic demand to match resource utilization with resource demand.

An aspect of this description is directed to a device [8], including a KPI predictor configured to receive performance metrics regarding resource allocation and capacity of pods, measure a current traffic demand, and predict a future traffic demand versus a current system capacity, a scaling decision configured to select a pod capacity and scaling in terms of a number of pods and a pod capacity version based on the measured current traffic demand and the predicted future traffic demand verses the current system capacity to provide optimal performance for the current traffic demand and the future traffic demand according to pod capacity categories, wherein the scaling decision generates scaling commands for the selected pod capacity and the selected scaling to provide fine grained scaling for optimizing energy consumption according to the pod capacity categories, and a container manager configured to receiving the scaling commands to scale pods to fulfill the current traffic demand and the future traffic demand according to pod capacity categories.

The device described in [8] further comprising a Non-Real-Time Radio Access Network Intelligent Controller (Non-RT RIC) configured to collect Open-Cloud Fault, Configuration, Accounting, Performance, Security (FCAPS) data over an O2 interface, and to collect E2 node data over an O1 interface, wherein the Non-RT RIC uses rApps to apply the scaling commands received from the scaling decision to pods deployed in an Open-Cloud (O-Cloud) System, wherein the performance metrics includes performance metrics for the Non-RT RIC based on collection of the Open-Cloud Fault, Configuration, Accounting, Performance, Security (FCAPS) data over the O2 interface, and collection of E2 node data over the O1 interface, and wherein the Non-RT RIC trains and deploys AI/ML models to generate scaling guidance for the O-Cloud or the E2 Nodes based on priority, load and energy consumption, and service quality specifications.

The device described in any of [8] to [9], wherein the Non-RT RIC is configured to train and deploy the AI/ML models by training and deploying at least one of a Linear Regression model, a Feedforward Neural Networks (FNN), a Convolutional Neural Networks (CNN) model, or a Long Short Term Memory model.

The device described in any of [8] to [10], wherein the scaling decision is configured to generate the scaling commands based on data received from Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, and meeting latency budget, and hardware configurations.

The device described in any of [8] to [11], wherein the KPI Predictor is configured to receive performance metrics regarding resource allocation and capacity of pods by receiving one or more of a number of Radio Resource Control (RRC) connections, a number of active/inactive User Equipment (UEs), a number of Data Radio Bearers (DRBs), or an average throughput.

The device described in any of [8] to [12], wherein the processor is configured to send the scaling commands to the Kubernetes API by sending the scaling commands to the Kubernetes API to instruct Deployment/Replication Controller (RC) to scale pods according to pod capacity categories.

The device described in any of [8] to [13], wherein the scaling decision is configured to select the pod capacity and to select the scaling in terms of the number of pods and pod capacity version selections based on the measured current traffic demand and the predicted future traffic demand by tracking traffic demand using a fine granularity to match the current system capacity with actual traffic demand to match resource utilization with resource demand.

An aspect of this description is directed to a non-transitory computer-readable media having computer-readable instructions stored thereon for performing operations including implementing an Artificial Intelligent/Machine Learning (AI/ML)-based horizontal pod autoscaler (HPA), receiving, at the HPA, performance metrics regarding resource allocation and capacity of pods, measuring a current traffic demand and predicting a future traffic demand versus a current system capacity, selecting a pod capacity and selecting scaling in terms of a number of pods and a pod capacity version based on the measured current and predicted future traffic demand verses the current system capacity to provide optimal performance for the current traffic demand and the future traffic demand according to pod capacity categories, generating scaling commands for the selected pod capacity and the selected scaling to provide fine grained scaling for optimizing energy consumption according to pod capacity categories, and based on the scaling commands, scaling pods to fulfill the current traffic demand and the future traffic demand according to pod capacity categories.

The non-transitory computer-readable media described in [15], wherein the implementing the AI/ML-based HPA includes implementing a Non-Real-Time Radio Access Network Intelligent Controller (Non-RT RIC), wherein the Non-RT RIC uses rApps to apply the scaling commands to pods deployed in an Open-Cloud (O-Cloud) System, and wherein the receiving the performance metrics includes obtaining performance metrics by the Non-RT RIC by collecting O-Cloud Fault, Configuration, Accounting, Performance, Security (FCAPS) data over an O2 interface, collecting E2 node data over an O1 interface, and wherein the Non-RT RIC trains and deploys AI/ML models to generate scaling guidance for the O-Cloud or the E2 Nodes based on priority, load and energy consumption, and service quality specifications, and wherein the training and deploying the AI/ML models by the Non-RT RIC includes training and deploying at least one of a Linear Regression model, a Feedforward Neural Networks (FNN), a Convolutional Neural Networks (CNN) model, or a Long Short Term Memory model.

The non-transitory computer-readable media described in any of [15] to [16], wherein the scaling commands are generated by a Scaling Decision based on data received from and Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, and meeting latency budget, and hardware configurations.

The non-transitory computer-readable media described in any of [15] to [17], wherein the receiving, at the HPA, performance metrics regarding resource allocation and capacity of pods includes receiving one or more of a number of Radio Resource Control (RRC) connections, a number of active/inactive User Equipment (UEs), a number of Data Radio Bearers (DRBs), or an average throughput.

The non-transitory computer-readable media described in any of [15] to [18], wherein the sending the scaling commands to the Kubernetes API includes sending the scaling commands to the Kubernetes API to instruct Deployment/Replication Controller (RC) to scale pods according to pod capacity categories.

The non-transitory computer-readable media described in any of [15] to [19], wherein the selecting the pod capacity and the selecting the scaling in terms of the number of pods and pod capacity version selections based on the measured current traffic demand and the predicted future traffic demand includes tracking traffic demand using a fine granularity to match the current system capacity with actual traffic demand to match resource utilization with resource demand. Separate instances of these programs are able to be executed on or distributed across any number of separate computer systems. Thus, although certain steps have been described as being performed by certain devices, software programs, processes, or entities, this is not meant to be a limitation. A variety of alternative implementations will be understood by those having ordinary skill in the art.

Additionally, those having ordinary skill in the art readily recognize that the techniques described above are able to be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for saving energy through flexible pod capacity selection during horizontal pod autoscaling, comprising:

implementing an Artificial Intelligent/Machine Learning (AI/ML)-based horizontal pod autoscaler (HPA);

receiving, at the AI/ML-based HPA, performance metrics regarding resource allocation and capacity of pods;

analyzing a traffic pattern and measuring a current system capacity;

determining a traffic curve representing the traffic pattern associated with a current traffic demand on the current system capacity;

selecting an Artificial Intelligence/Machine Learning (AI/ML) model based on the traffic curve;

predicting, by the AI/ML-based HPA, a future traffic demand using the selected AI/ML model;

selecting pod capacity scaling in terms of a number of the pods and a pod capacity version based on the predicted future traffic demand verses the current system capacity to provide optimal performance for the future traffic demand according to pod capacity categories; and scaling the pods to fulfill the future traffic demand according to the pod capacity categories, wherein the implementing the AI/ML-based HPA includes implementing a Non-Real-Time Radio Access Network Intelligent Controller (Non-RT RIC), wherein the Non-RT RIC uses rApps to apply scaling commands to the pods deployed in an Open-Cloud (O-Cloud) System;

wherein the receiving the performance metrics includes obtaining the performance metrics by the Non-RT RIC by collecting O-Cloud Fault, Configuration, Accounting, Performance, Security (FCAPS) data over an O2 interface, collecting E2 node data over an O1 interface, and wherein the Non-RT RIC trains and deploys AI/ML models to generate scaling guidance for the O-Cloud System or E2 Nodes based on priority, load and energy consumption, and service quality specifications.

2. The method of claim 1, wherein the training and deploying the AI/ML models by the Non-RT RIC includes training and deploying at least one of a Linear Regression model, a Feedforward Neural Networks (FNN), a Convolutional Neural Networks (CNN) model, or a Long Short Term Memory model.

3. The method of claim 1 further comprising generating scaling commands for the selected pod capacity scaling to provide scaling for optimizing energy consumption according to the pod capacity categories, wherein the scaling commands are generated by a Scaling Decision based on data received from Application Type and Quality of Experience (QoE) application specifications, Quality of Service (QOS)-related configurations and specifications, a Scaling Policy for increasing performance, increasing energy savings, minimizing hardware resource utilization, maximizing throughput, minimizing latency, meeting latency budget, and hardware configurations.

4. The method of claim 1, wherein the receiving, at the AI/ML-based HPA, the performance metrics regarding the resource allocation and the capacity of the pods includes receiving one or more of a number of Radio Resource Control (RRC) connections, a number of active/inactive User Equipment (UEs), a number of Data Radio Bearers (DRBs), or an average throughput.

5. The method of claim 1 further comprising generating scaling commands for the selected pod capacity scaling to provide scaling for optimizing energy consumption according to the pod capacity categories and sending the scaling commands to a Container Manager to instruct a Deployment/Replication Controller (RC) to scale the pods according to the pod capacity categories.

6. The method of claim 1, wherein the selecting the pod capacity scaling in terms of the number of pods and pod capacity version selections based on the predicted future traffic demand includes tracking traffic demand and matching the current system capacity with actual traffic demand or matching resource utilization with resource demand, or both.

7. A device, comprising:

at least one processor configured to implement:

a KPI predictor configured to receive performance metrics regarding resource allocation and capacity of pods, analyze a traffic pattern, measure a current system capacity, determine a traffic curve representing the traffic pattern associated with a current traffic demand on the current system capacity, select an Artificial Intelligence/Machine Learning (AI/ML) model based on the traffic curve, and predict a future traffic demand using the selected AI/ML model;

a scaling decision configured to select a pod capacity scaling in terms of a number of the pods and a pod capacity version based on the predicted future traffic demand verses the current system capacity to provide optimal performance for the future traffic demand according to pod capacity categories;

a container manager configured to scale the pods to fulfill the future traffic demand according to the pod capacity categories; and a Non-Real-Time Radio Access Network Intelligent Controller (Non-RT RIC), wherein the Non-RT RIC uses rApps to apply scaling commands received from the scaling decision to the pods deployed in an Open-Cloud (0-Cloud) System;

wherein the Non-RT RIC is configured to collect Open-Cloud Fault, Configuration, Accounting, Performance, Security (FCAPS) data over an 02 interface, and to collect E2 node data over an 01 interface, wherein the performance metrics includes the performance metrics for the Non-RT RIC based on collection of the FCAPS data over the 02 interface, and collection of E2 node data over the 01 interface, and wherein the Non-RT RIC trains and deploys one or more AI/ML models to generate scaling guidance for the O-Cloud System or E2 Nodes based on priority, load, energy consumption, and service quality specifications.

8. The device of claim 7, wherein the Non-RT RIC is configured to train and deploy the one or more AI/ML models by training and deploying at least one of a Linear Regression model, a Feedforward Neural Networks (FNN), a Convolutional Neural Networks (CNN) model, or a Long Short Term Memory model.

9. The device of claim 7, wherein the scaling decision generates scaling commands for the selected pod capacity scaling to provide scaling for optimizing energy consumption according to the pod capacity categories and the scaling decision is configured to generate the scaling commands based on data received from Application Type and Quality of Experience (QoE) application specifications, Quality of Service (QOS)-related configurations and specifications, a Scaling Policy for increasing performance, increasing energy savings, minimizing hardware resource utilization, maximizing throughput, minimizing latency, meeting latency budget, and hardware configurations.

10. The device of claim 7, wherein the KPI Predictor is configured to receive the performance metrics regarding the resource allocation and the capacity of the pods by receiving one or more of a number of Radio Resource Control (RRC) connections, a number of active/inactive User Equipment (UEs), a number of Data Radio Bearers (DRBs), or an average throughput.

11. The device of claim 7, wherein the scaling decision is configured to generate scaling commands for the selected pod capacity scaling to provide scaling for optimizing energy consumption according to the pod capacity categories, and to send the scaling commands to the container manager to instruct a Deployment/Replication Controller (RC) to scale pods according to the pod capacity categories.

12. The device of claim 7, wherein the scaling decision is configured to select the pod capacity and to select the scaling in terms of the number of the pods and pod capacity version selections based on the predicted future traffic demand by tracking traffic demand and matching the current system capacity with actual traffic demand or matching resource utilization with resource demand, or both.

13. A non-transitory computer-readable media having computer-readable instructions stored thereon for performing operations comprising:

implementing an Artificial Intelligent/Machine Learning (AI/ML)-based horizontal pod autoscaler (HPA);

receiving, at the AI/ML-based HPA, performance metrics regarding resource allocation and capacity of pods;

analyzing a traffic pattern and measuring a current system capacity;

determining a traffic curve representing the traffic pattern associated with a current traffic demand on the current system capacity;

selecting an Artificial Intelligence/Machine Learning (AI/ML) model based on the traffic curve;

predicting, by the AI/ML-based HPA, a future traffic demand using the selected AI/ML model;

selecting pod capacity scaling in terms of a number of the pods and a pod capacity version based on the predicted future traffic demand verses the current system capacity to provide optimal performance for the future traffic demand according to pod capacity categories; and scaling the pods to fulfill the future traffic demand according to the pod capacity categories, wherein the implementing the AI/ML-based HPA includes implementing a Non-Real-Time Radio Access Network Intelligent Controller (Non-RT RIC), wherein the Non-RT RIC uses rApps to apply scaling commands to the pods deployed in an Open-Cloud (O-Cloud) System;

wherein the receiving the performance metrics includes obtaining the performance metrics by the Non-RT RIC by collecting O-Cloud Fault, Configuration, Accounting, Performance, Security (FCAPS) data over an O2 interface, collecting E2 node data over an O1 interface, and wherein the Non-RT RIC trains and deploys AI/ML models to generate scaling guidance for the O-Cloud System or E2 Nodes based on priority, load, energy consumption, and service quality specifications; and wherein the training and deploying the AI/ML models by the Non-RT RIC includes training and deploying at least one of a Linear Regression model, a Feedforward Neural Networks (FNN), a Convolutional Neural Networks (CNN) model, or a Long Short Term Memory model.

14. The non-transitory computer-readable media of claim 13 further comprising generating scaling commands for the selected pod capacity scaling to provide scaling for optimizing energy consumption according to the pod capacity categories, wherein the scaling commands are generated by a Scaling Decision based on data received from Application Type and Quality of Experience (QoE) application specifications, Quality of Service (QoS)-related configurations and specifications, a Scaling Policy for increasing performance, increasing energy savings, minimizing hardware resource utilization, maximizing throughput, minimizing latency, meeting latency budget, and hardware configurations.

15. The non-transitory computer-readable media of claim 13, wherein the receiving, at the AI/ML-based HPA, the performance metrics regarding the resource allocation and the capacity of the pods includes receiving one or more of a number of Radio Resource Control (RRC) connections, a number of active/inactive User Equipment (UEs), a number of Data Radio Bearers (DRBs), or an average throughput.

16. The non-transitory computer-readable media of claim 13 further comprising generating scaling commands for the selected pod capacity scaling to provide scaling for optimizing energy consumption according to the pod capacity categories and sending the scaling commands to a Container Manager to instruct a Deployment/Replication Controller (RC) to scale the pods according to the pod capacity categories.

17. The non-transitory computer-readable media of claim 13, wherein the selecting the pod capacity scaling in terms of the number of pods and pod capacity version selections based on the predicted future traffic demand includes tracking traffic demand and matching the current system capacity with actual traffic demand or matching resource utilization with resource demand, or both.

* * * * *